United States Patent
Chen et al.

(10) Patent No.: US 11,558,282 B2
(45) Date of Patent: Jan. 17, 2023

(54) SYSTEM AND METHOD FOR INTERIOR GATEWAY PROTOCOL (IGP) FAST CONVERGENCE

(71) Applicant: HUAWEI TECHNOLOGIES CO., LTD., Shenzhen (CN)

(72) Inventors: Huaimo Chen, Bolton, MA (US); Zhenbin Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 2 days.

(21) Appl. No.: 17/068,457

(22) Filed: Oct. 12, 2020

(65) Prior Publication Data
US 2021/0029020 A1 Jan. 28, 2021

Related U.S. Application Data

(63) Continuation of application No. PCT/US2020/017698, filed on Feb. 11, 2020.

(60) Provisional application No. 62/806,077, filed on Feb. 15, 2019.

(51) Int. Cl.
*H04L 45/12* (2022.01)
*H04L 45/00* (2022.01)
*H04L 45/02* (2022.01)

(52) U.S. Cl.
CPC ............ *H04L 45/123* (2013.01); *H04L 45/26* (2013.01); *H04L 45/32* (2013.01); *H04L 45/02* (2013.01)

(58) Field of Classification Search
CPC ....... H04L 45/02; H04L 45/123; H04L 45/26; H04L 45/32
See application file for complete search history.

(56) References Cited

U.S. PATENT DOCUMENTS

| | | | | |
|---|---|---|---|---|
| 7,177,295 B1* | 2/2007 | Sholander | ............. | H04W 40/26 370/338 |
| 7,751,336 B2 | 7/2010 | Hopps et al. | | |
| 10,382,323 B1* | 8/2019 | Dave | ....................... | H04L 45/50 |
| 2003/0179742 A1* | 9/2003 | Ogier | .................... | H04W 8/005 370/389 |

(Continued)

FOREIGN PATENT DOCUMENTS

| CN | 103441936 A | 12/2013 |
|---|---|---|
| CN | 104639434 A | 5/2015 |

(Continued)

OTHER PUBLICATIONS

Francois et al., "Achieving Sub-Second IGP Convergence in Large IP Networks*", ACM SIGCOMM Computer Communication Review, vol. 35, No. 2, Jul. 2005 pp. 35-44 (Year: 2005).*

(Continued)

*Primary Examiner* — Shah M Rahman

(74) *Attorney, Agent, or Firm* — Conley Rose, P.C.

(57) ABSTRACT

A method, performed by a network node, for enabling Interior Gateway Protocol (IGP) fast convergence, the method includes determining that there is a significant change in link state information, the significant change is at least one of a link down, a link up, and a link metric change. The method further includes originating a link state packet comprising a flag that is set to indicate the significant change in the link state information; and distributing the link state packet.

20 Claims, 17 Drawing Sheets

(56) References Cited

U.S. PATENT DOCUMENTS

| | | | |
|---|---|---|---|
| 2004/0136371 A1* | 7/2004 | Muralidhar | H04L 45/60 370/389 |
| 2004/0162113 A1* | 8/2004 | Oomoto | H04W 8/04 455/560 |
| 2006/0036719 A1* | 2/2006 | Bodin | H04L 47/782 709/223 |
| 2006/0045024 A1* | 3/2006 | Previdi | H04L 47/24 370/254 |
| 2006/0133298 A1* | 6/2006 | Ng | H04L 45/02 370/254 |
| 2006/0285529 A1* | 12/2006 | Hares | H04W 40/26 370/400 |
| 2007/0286091 A1 | 12/2007 | Hopps et al. | |
| 2008/0101418 A1* | 5/2008 | Vasseur | H04L 12/66 370/503 |
| 2013/0182609 A1 | 7/2013 | Mo et al. | |
| 2013/0336109 A1* | 12/2013 | Previdi | H04L 41/12 370/254 |
| 2014/0317271 A1* | 10/2014 | Kim | H04L 12/185 709/224 |
| 2015/0085706 A1* | 3/2015 | Ginsberg | H04L 45/48 370/256 |
| 2016/0119229 A1* | 4/2016 | Zhou | H04L 12/4633 370/392 |
| 2016/0173415 A1 | 6/2016 | Wang et al. | |
| 2016/0269272 A1* | 9/2016 | Li | H04L 67/2852 |
| 2017/0288814 A1* | 10/2017 | Lesartre | H04L 1/1835 |
| 2018/0115481 A1* | 4/2018 | White | H04L 45/025 |

FOREIGN PATENT DOCUMENTS

| | | |
|---|---|---|
| CN | 106059920 A | 10/2016 |
| CN | 106789673 A | 5/2017 |

OTHER PUBLICATIONS

Honkola, Jukka, "OSPF and IS-IS Evolution", Helsinki University of Technology, HUTT-110.551 Seminar on Internetworking, Sjökulla, Apr. 26-27, 2004 Total pp. 9 (Year: 2004).*

Lindem etal, "OSPFv3 Link State Advertisement (LSA) Extensibility", Internet Engineering Task Force (IETF), RFC 8362, Apr. 2018, https://www.rfc-editor.org/rfc/pdfrfc/rfc8362.txt.pdf, Total pp. 33 (Year: 2018).*

Haas, Z., et al., "The Zone Routing Protocol (ZRP) for Ad Hoc Networks," draft-ietf-manet-zone-zrp-03.txt, Mar. 2000, 55 pages.

Li, Y., "Research and Implementation on Security Mechanism of Intra Domain Routing Protocol", A theses submitted in partial fulfillment of the requirements for the professional degree of Master of Engineering in Computer Science and Technology, Graduate School of National University of Defense Technology, Changsha, Hunan, P.R.China, Apr. 16, 2015, 69 pages.

Haas, Z., et al.,"The Zone Routing Protocol (ZRP) for Ad Hoc Networks", draft-ietf-manet-zone-zrp-03.txt, Mar. 2000, 51 pages.

English Translation of Kang, J.S., et al, "Research On Integrated IS-IS Routing Protocol," Radio Communications Technology, vol. 33 No. 2, 2007, 8 pages.

* cited by examiner

200A

```
    0                   1                   2                   3
    0 1 2 3 4 5 6 7 8 9 0 1 2 3 4 5 6 7 8 9 0 1 2 3 4 5 6 7 8 9 0 1
   +-+-+-+-+-+-+-+-+-+-+-+-+-+-+-+-+-+-+-+-+-+-+-+-+-+-+-+-+-+-+-+-+
   |           LS age 202          |   Options 204 |     1    206  |
   +-+-+-+-+-+-+-+-+-+-+-+-+-+-+-+-+-+-+-+-+-+-+-+-+-+-+-+-+-+-+-+-+
   |                        Link State ID   208                    |
   +-+-+-+-+-+-+-+-+-+-+-+-+-+-+-+-+-+-+-+-+-+-+-+-+-+-+-+-+-+-+-+-+
   |                       Advertising Router   210                |
   +-+-+-+-+-+-+-+-+-+-+-+-+-+-+-+-+-+-+-+-+-+-+-+-+-+-+-+-+-+-+-+-+
   |                        LS sequence number   212               |
   +-+-+-+-+-+-+-+-+-+-+-+-+-+-+-+-+-+-+-+-+-+-+-+-+-+-+-+-+-+-+-+-+
   |         LS checksum  214      |            length  216        |
   +-+-+-+-+-+-+-+-+-+-+-+-+-+-+-+-+-+-+-+-+-+-+-+-+-+-+-+-+-+-+-+-+
   |     0     |V|E|B|D|U|C|   0   |          # links  232         |
   +-+-+-+-+-+-+-+-+-+-+-+-+-+-+-+-+-+-+-+-+-+-+-+-+-+-+-+-+-+-+-+-+
   |          218 220 222 224 226 230   Link ID  234               |
   +-+-+-+-+-+-+-+-+-+-+-+-+-+-+-+-+-+-+-+-+-+-+-+-+-+-+-+-+-+-+-+-+
   |                          Link Data  236                       |
   +-+-+-+-+-+-+-+-+-+-+-+-+-+-+-+-+-+-+-+-+-+-+-+-+-+-+-+-+-+-+-+-+
   |     Type  238 |    # TOS  240 |          metric  242          |
   +-+-+-+-+-+-+-+-+-+-+-+-+-+-+-+-+-+-+-+-+-+-+-+-+-+-+-+-+-+-+-+-+
   |                              ...                              |
   +-+-+-+-+-+-+-+-+-+-+-+-+-+-+-+-+-+-+-+-+-+-+-+-+-+-+-+-+-+-+-+-+
   |    TOS   244  |       0       |        TOS  metric  246       |
   +-+-+-+-+-+-+-+-+-+-+-+-+-+-+-+-+-+-+-+-+-+-+-+-+-+-+-+-+-+-+-+-+
   |                          Link ID  234                         |
   +-+-+-+-+-+-+-+-+-+-+-+-+-+-+-+-+-+-+-+-+-+-+-+-+-+-+-+-+-+-+-+-+
   |                         Link Data  236                        |
   +-+-+-+-+-+-+-+-+-+-+-+-+-+-+-+-+-+-+-+-+-+-+-+-+-+-+-+-+-+-+-+-+
   |                              ...                              |
```

*FIG. 2A*

SYSTEM AND METHOD FOR INTERIOR GATEWAY PROTOCOL (IGP) FAST CONVERGENCE

CROSS-REFERENCE TO RELATED APPLICATIONS

This application is a continuation of International Application No. PCT/US2020/017698 filed on Feb. 11, 2020, by Futurewei Technologies, Inc., and titled "System And Method For Interior Gateway Protocol (IGP) Fast Convergence," which claims the benefit of U.S. provisional patent application Ser. No. 62/806,077, filed Feb. 15, 2019, by Huaimo Chen et al., and titled "System And Method For IGP Fast Convergence," which are incorporated by reference in their entireties.

TECHNICAL FIELD

The present application relates to network communication, and more specifically to a system and method for Interior Gateway Protocol (IGP) fast convergence.

BACKGROUND

A routing protocol specifies how routers communicate with each other, distributing information that enables them to select routes between any two nodes on a computer network. An interior gateway protocol (IGP) is a type of protocol used for exchanging routing information between gateways (commonly routers) within an autonomous system (AS). This routing information can then be used to route network-layer protocols like Internet Protocol (IP). An AS is a collection of connected IP routing prefixes under the control of one or more network operators on behalf of a single administrative entity or domain that presents a common, clearly defined routing policy to the internet (for example, a system of corporate local area networks).

Within IGP, there are different types. Type 1 IGP is referred to as a link-state routing protocol. The link-state routing protocol is performed by every switching node in the network (i.e., nodes that are prepared to forward packets; in the Internet, these are called routers). The basic concept of link-state routing is that every node constructs a map of the connectivity to the network, in the form of a graph, showing which nodes are connected to which other nodes. Each node then independently calculates the best logical path or the best next hop interface from it to every possible destination in the network. Each collection of best paths will then form each node's routing table. Examples of link-state routing protocols include Open Shortest Path First (OSPF) routing protocol and Intermediate System to Intermediate System (IS-IS or ISIS).

OSPF is a standard routing protocol designated by the Internet Engineering Task Force (IETF). OSPF uses Link State Advertisement (LSA) to exchange routing information between routers. Each router within an area will flood a type 1 LSA (also called router LSA) within the area. LSA's are encapsulated behind an OPSF packet and then an IP packet. An area is a logical group of OSPF-based networks, routers, and links that have the same area number. Routers that belong to the same area keep a topological database for the entire area. The router LSA contains information about directly connected links in the area to which the router belongs (e.g., a list with all the directly connected links of this router). They are flooded to all routers in that area. If the router is an ABR (Area Border Router), it generates type 1 LSAs for all the areas to which it is connected and sends those LSAs to all neighbors in corresponding areas.

IS-IS is a routing protocol standardized by the International Standards Organization (ISO). IS-IS uses Link State Protocol Data Unit (LSP) to exchange routing information between routers. LSP is a packet of information generated by a network router in a link state routing protocol that lists the router's neighbors. A LSP packet can also be further defined as special datagrams that determine the names of, and the cost or distance to, any neighboring routers and associated networks. They are used to efficiently determine what the new neighbor is, if a link failure occurs, and the cost of changing a link if the need arises.

Some additional differences between OSPF and IS-IS are that OSPF supports non-broadcast multiple access network (NBMA) and point-to-multipoint links, whereas IS-IS does not; IS-IS runs on the data link layer (L2), whereas OSPF runs on the network layer (L3); and OSPF supports virtual link, whereas IS-IS does not.

Irrespective of which IGP routing protocol is used, as a network becomes bigger and bigger, IGP routing convergence is slower and slower when a change such as a link failure occurs in the network. IGP convergence or converges when all components of every router in the network, including the Routing Information Base (RIB) and Forwarding Information Base (FIB), along with software and hardware tables, are provided with the most recent route change(s) such that forwarding for a route entry is successful on the Best Egress (or next hop) Interface. The Best Egress Interface is the outbound interface or set of outbound interfaces in an Equal Cost Multipath (ECMP) set or parallel link set of the Device under Test (DUT) for traffic routed to the best next-hop. After a link change occurs in the network, and before IGP converges, there may be some routing loops in the network where some traffic will get lost.

SUMMARY

A first aspect relates to a computer-implemented method performed by a network node for enabling Interior Gateway Protocol (IGP) fast convergence. The method includes determining that there is a significant change in link state information; originating a link state packet comprising a flag that is set to indicate the significant change in the link state information; and distributing the link state packet.

A second aspect relates to a computer-implemented method performed by a network node for enabling Interior Gateway Protocol (IGP) fast convergence. The method includes receiving a packet comprising link state information; determining that there is a significant change in the link state information based on a flag setting in the packet; and performing accelerated flooding of the packet in response to the determination that the flag setting in the packet indicates that there is a significant change in the link state information in the packet.

In a first implementation form of the computer-implemented method according to any of the preceding aspects, the packet is an Open Shortest Path First version 2 (OSPFv2) router Link State Advertisement (LSA).

In a second implementation form of the computer-implemented method according to any of the preceding aspects, the packet is an Open Shortest Path First version 3 (OSPFv3) router LSA.

In a third implementation form of the computer-implemented method according to any of the preceding aspects, the packet is an Intermediate System to Intermediate System (IS-IS) Link State Protocol Data Unit (LSP).

In a fourth implementation form of the computer-implemented method according to any of the preceding aspects or any preceding implementation form of any of the preceding aspects, the significant change is at least one of a link down, a link up, and a link metric change, and wherein the flag is an "S" flag that is set to one to indicate that there is a significant change.

In a fifth implementation form of the computer-implemented method according to any of the preceding aspects or any preceding implementation form of any of the preceding aspects, the significant change is a link down, and wherein the flag is a "D" flag that is set to one to indicate that there is a link down.

In a sixth implementation form of the computer-implemented method according to any of the preceding aspects or any preceding implementation form of any of the preceding aspects, the significant change is a link up, and wherein the flag is a "U" flag that is set to one to indicate that there is a link up.

In a seventh implementation form of the computer-implemented method according to any of the preceding aspects or any preceding implementation form of any of the preceding aspects, the significant change is a link metric change, and wherein the flag is a "C" flag that is set to one to indicate that there is a link metric change.

In an eighth implementation form of the computer-implemented method according to the second aspect or any preceding implementation form of the second aspect, the accelerated flooding of the packet comprises delaying a checksum validation of the packet until after the packet is flooded to neighboring nodes.

In a ninth implementation form of the computer-implemented method according to the second aspect or any preceding implementation form of the second aspect, the checksum validation of the packet after the packet is flooded to neighboring nodes and before the link state information is installed in a link state database of the network node.

In a tenth implementation form of the computer-implemented method according to the second aspect or any preceding implementation form of the second aspect, the accelerated flooding of the packet comprises an accelerated control plane transfer process of sending the packet from a data plane to a control plane of the network node.

In an eleventh implementation form of the computer-implemented method according to the second aspect or any preceding implementation form of the second aspect, the accelerated flooding of the packet comprises an accelerated OSPF transfer process of sending an Internet Protocol (IP) packet from an IP layer to an OSPF of the network node.

In a twelfth implementation form of the computer-implemented method according to the second aspect or any preceding implementation form of the second aspect, the accelerated flooding of the packet comprises an accelerated Intermediate System to Intermediate System (IS-IS) transfer process of sending a link layer packet from a link layer to an IS-IS of the network node.

A third aspect relates to a network node comprising network communication means, a data storage means, and a processing means, the network node specially configured to perform any of the preceding aspects or any preceding implementation form of any of the preceding aspects.

For the purpose of clarity, any one of the foregoing embodiments may be combined with any one or more of the other foregoing embodiments to create a new embodiment within the scope of the present disclosure.

These and other features, and the advantages thereof, will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 2A is a schematic diagram illustrating an OSPF version 2 (OSPFv2) router LSA according to an embodiment of the present disclosure.

DETAILED DESCRIPTION

It should be understood at the outset that, although illustrative implementations of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As stated above, after a link change occurs in the network, and before IGP converges, there may be some routing loops in the network where some traffic will get lost. The problem increases as the network grows. In other words, the bigger the network is, the more traffic may get lost when a change in the network occurs. The disclosed embodiments of the present disclosure seek to address the above issues by providing various systems and methods for IGP fast convergence.

The present disclosure describes various embodiments that resolve the above problems. It accelerates the IGP routing convergence through speeding up processing and delivering the change such as a link down. For critical changes such as a link down, it is explicitly indicated in the link state message containing the changes. Along the path through which the message goes, the message with critical changes is handled with higher priority and in accelerated speed.

Figure 1A:
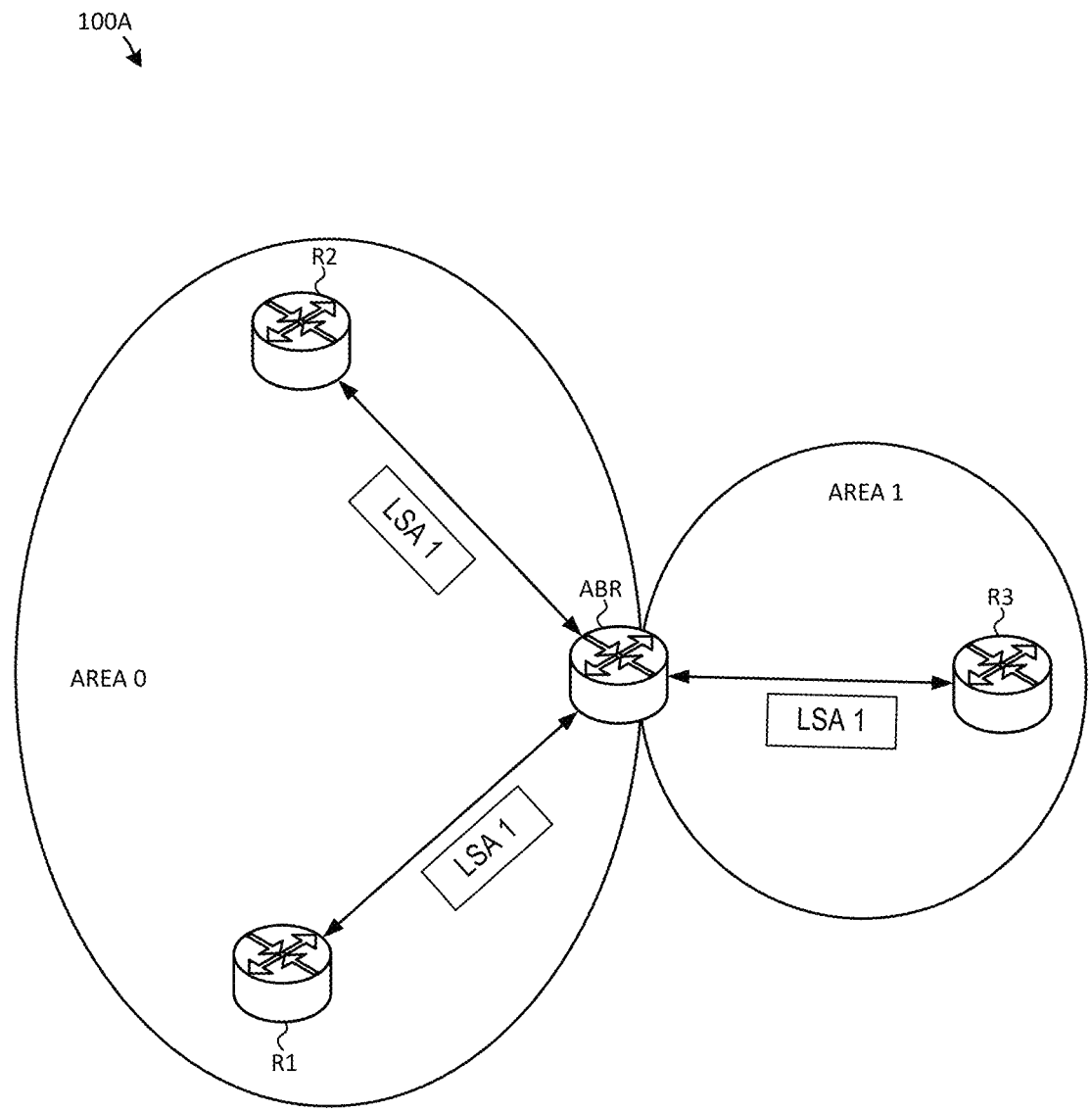
FIG. 1A is a schematic diagram illustrating a network depicting an OSPF network topology according to an embodiment of the present disclosure.

FIG. 1A is a schematic diagram illustrating a network 100A depicting an OSPF network topology according to an embodiment of the present disclosure. The network 100A includes two OSPF areas, area 0 and area 1. The area 0 includes a first router (R1), a second router (R2), and an ABR that borders area 0 and area 1, which includes a third router (R3). The ABR has three links; two of them connected in area 0 to R1 and R2, and another one in area 1 connected to R3. As stated above, OSPF uses LSA to exchange routing information between routers. In the depicted embodiment, each of the routers R1, R2, ABR, and R3 will generate an LSA of type 1 (i.e., a router LSA) that contains information about directed connected links in the area to which the router belongs. The router LSAs are flooded to all routers in that area. If the router is an ABR, it generates router LSAs for all the areas to which it is connected and sends those LSAs to all neighbors in corresponding areas. For example, in the depicted embodiment, the ABR generates one LSA for area 0 that includes links to R1 and R2. This LSA will be sent to all neighbors in area 0 (i.e., to R1 and R2). Another LSA will be generated by the ABR for area 1 that will include links in area 1 which is the link to R3. This LSA will be sent to R3 because R3 is the only neighbor in area 1. This process is also performed by each of the routers in the area. For instance, R1 and R2 send to the ABR their router LSA with all directly connected links in area 0, and R3 does the same with its link connected in area 1. The LSA received by the ABR from R2 is transmitted by the ABR to R1 and vice versa, R1 LSA is transmitted by the ABR to R2. This way, every router in an area knows about all the other routers in the area and their enabled OSPF links.

Figure 1B:
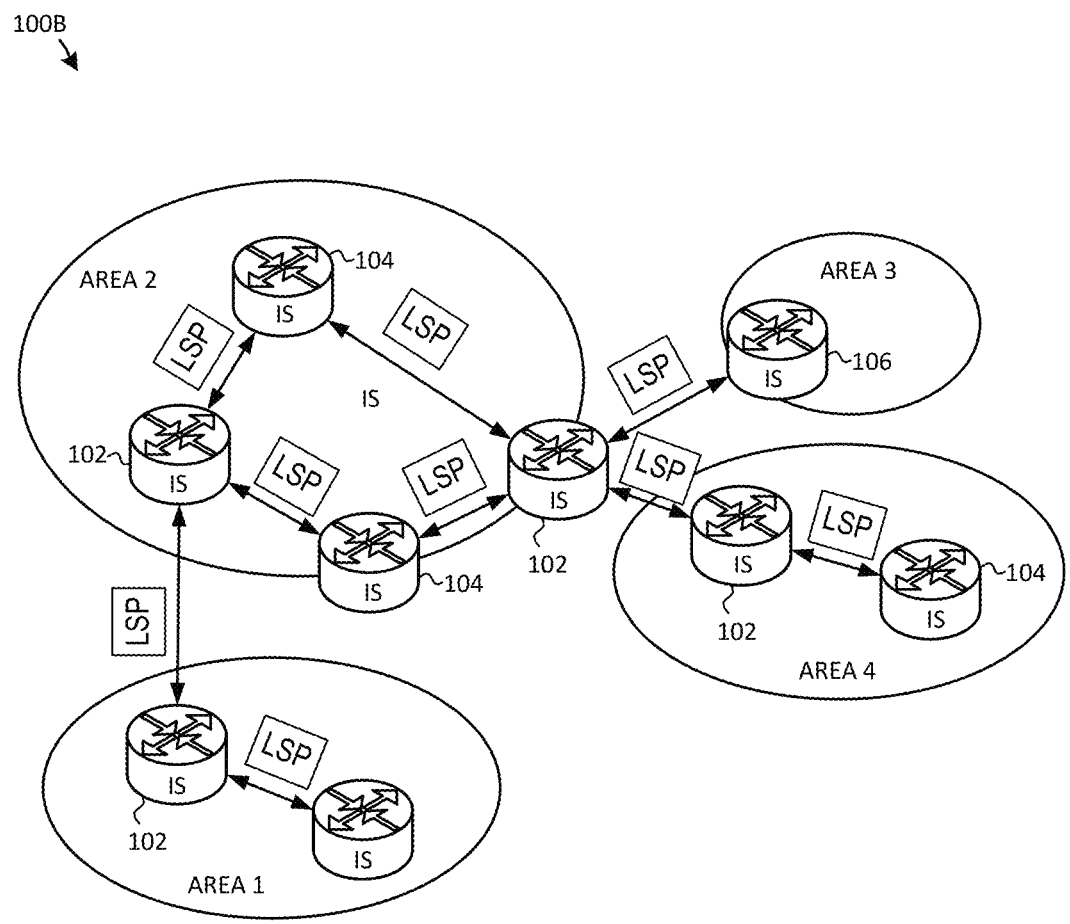
FIG. 1B is a schematic diagram illustrating a network depicting an IS-IS network topology according to an embodiment of the present disclosure.

FIG. 1B is a schematic diagram illustrating a network 100B depicting an IS-IS network topology according to an embodiment of the present disclosure. The network 100B depicts a routing domain that is divided into four subdomains (referred to as an area): area 1, area 2, area 3, and area 4. A device in Open Systems Interconnection (OSI) terminology is referred to as an Intermediate System (IS). Each of the areas includes one or more ISs 102, which are computers or network equipment configured to forward received data onward towards an intended recipient (e.g., routers). Intermediate systems do not need to understand the information being sent between end users, but do understand and may modify the information added by the network to provide the communication.

IS-IS protocol has two levels or hierarchies, Level 1 and Level 2. Level 1 corresponds with OSPF intra-area routing (i.e., routing within an area). Level 2 corresponds with the OSPF backbone area routing (i.e., routing between Level-1 areas). ISs that operate at Level 1 exchange routing information with other Level-1 ISs in the same area. ISs that operate at Level 2 exchange routing information with other Level-2 devices regardless of whether they are in the same Level-1 area. An IS may operate at Level 1, Level 2, or both. For example, in FIG. 1B, ISs 102 are both Level 1 and Level 2 (L1L2) routers, ISs 104 are only Level 1 routers, and IS 106 is only a Level 2 router.

As stated above, an IS generates LSPs to advertise its neighbors and the destination that are directly connected to the IS in order for each IS to build a complete network connectivity map. Level-1 LSPs are generated by ISs that support Level 1. The Level-1 LSPs are flooded throughout the Level-1 area. The set of Level-1 LSPs generated by all Level-1 ISs in an area is the Level-1 LSP Database (LSPDB). All Level-1 ISs in an area will have an identical Level-1 LSPDB and will therefore have an identical network connectivity map for the area. Level-2 LSPs are generated by ISs that support Level 2. Level-2 LSPs are flooded throughout the Level-2 subdomain. The set of Level-2 LSPs generated by all Level-2 ISs in the domain is the Level-2 LSP Database (LSPDB). All Level-2 ISs will have an identical Level-2 LSPDB and will therefore have an identical connectivity map for the Level-2 subdomain. When the content of the LSPDB changes, each IS independently reruns a shortest path calculation.

FIG. 2A is a schematic diagram illustrating an OSPF version 2 (OSPFv2) router LSA 200A according to an embodiment of the present disclosure. The OSPFv2 router LSA 200A can be communicated by a router, such as R1 in FIG. 1A, to distribute routing information between OSPF nodes.

The OSPFv2 router LSA 200A includes a standard LSA header, which includes a LS age field 202, an Options field 204, a LS Type field 206 of type 1, an Link State identifier (ID) field 208, an Advertising Router field 210, an LS sequence number field 212, a LS checksum field 214, and a Length field 216.

The LS age field 202 contains the age of the OSPFv2 router LSA 200A advertisement in seconds to enable old advertisements to be flushed from the routing domain. The Options field 204 can be used to specify one or more OSPFv2 options. The Options field 204 enables OSPF routers to support (or not support) optional capabilities, and to communicate their capability level to other OSPF routers. The LS Type field 206 is used to indicate the type of the LSA. In the depicted embodiment, a 1 is depicted in the LS Type field 206 to indicate that the LSA is a router-LSA. Each router in an area originates a router-LSA. The router-LSA describes the state and cost of the router's links (i.e., interfaces) to the area. All of the router's links to the area are described in a single router-LSA.

The Link State ID field 208 identifies the portion of the internet environment that is being described by the LSA. The contents of this field depend on the LSA's LS type. For example, in router-LSAs, the Link State ID field is set to the router's OSPF Router ID. Router-LSAs are flooded throughout a single area only. The Advertising Router field 210 contains the router ID of the router that originated the OSPFv2 router LSA 200A. The LS sequence number field 212 contains successive sequence numbers that is used to detect old or duplicate LSAs. The LS checksum field 214 contains a checksum of the complete contents of the OSPFv2 router LSA 200A including the LSA header, but excluding the LS age field 202. The Length field 216 represents the total length (in octets) of the OSPFv2 router LSA 200A.

The OSPFv2 router LSA 200A includes a virtual link endpoint (V) bit 218, an external (E) bit 220, and a border (B) bit 222. When the V bit 218 is set, the router is an endpoint of one or more fully adjacent virtual links having the described area as Transit area. When the E bit 220 is set, the router is an AS boundary router. When the B bit 222 is set, the router is an area border router.

The OSPFv2 router LSA 200A includes three new bits, a Down (D) bit 224, an Up (U) bit 226, and a Change (C) bit 230. In an embodiment, when the D bit 224 is set to one (1), this indicates that the router LSA contains a link down (i.e., an old link removed). In other words, a link that was included in a prior LSA is not included in the current LSA. When the D bit 224 remains set to zero (0), this indicates that the router LSA does not contain any link down. In an embodiment, when the U bit 226 is set to one (1), this indicates that the router LSA contains a link up (i.e., a new link). When the U bit 226 remains set to zero (0), this indicates that the router LSA does not contain any link up. In an embodiment, when the C bit 230 is set to one (1), this indicates that the router LSA contains a link metric change. In OSPF, a link metric change can be a change in cost of using this router link or other types of metric. When the C bit 230 remains set to zero (0), this indicates that the router LSA does not contain any link metric change.

The # links field 232 indicates the number of router links described in this LSA, which is the total collection of router links (i.e., interfaces) to the area. The remaining fields of the OSPFv2 router LSA 200A are used to describe each router link (i.e., interface). A type field 238 indicates the kind of link being described. For instance, link type 1 is a point-to-point connection to another router, link type 2 is a connection to a transit network, link type 3 is a connection to a stub network, and link type 4 is a Virtual link. The values of all the other fields describing a router link depend on the link's Type specified in the type field 238. For example, each link has an associated 32-bit Link Data field 236. For links to stub networks this field specifies the network's IP address mask. For other link types the Link Data field 236 specifies the router interface's IP address.

The Link ID field 234 identifies the object that this router link connects to. Again, the value of the Link ID field 234 depends on the link's Type. When connecting to an object that also originates an LSA (i.e., another neighboring router or a designated router for a transit network) via a link of Type 1, 2, or 4, the Link ID is equal to the neighboring LSA's Link State ID. This provides the key for looking up the neighboring LSA in the link state database during the routing table calculation.

Similarly, the value of the Link Data field 236 depends on the link's Type field 238. For connections to stub networks, Link Data specifies the network's IP address mask. For unnumbered point-to-point connections, Link Data specifies the interface's MIB-II ifIndex value. For the other link types, Link Data specifies the router interface's IP address. This latter piece of information is needed during the routing table build process, when calculating the IP address of the next hop.

The # type of service (TOS) field 240 specifies the number of different TOS metrics given for this link, not counting the required link metric. For example, if no additional TOS metrics are given, this field is set to 0. The metric field 242 specifies the cost of using this router link.

Additional TOS-specific information may also be included, for backward compatibility with previous versions of the OSPF specification. Within each link, and for each desired TOS, TOS-specific link information includes a TOS field 244 that indicates the IP Type of Service that this metric refers to, and a TOS metric field 246 that indicates TOS-specific metric information.

Figure 2B:
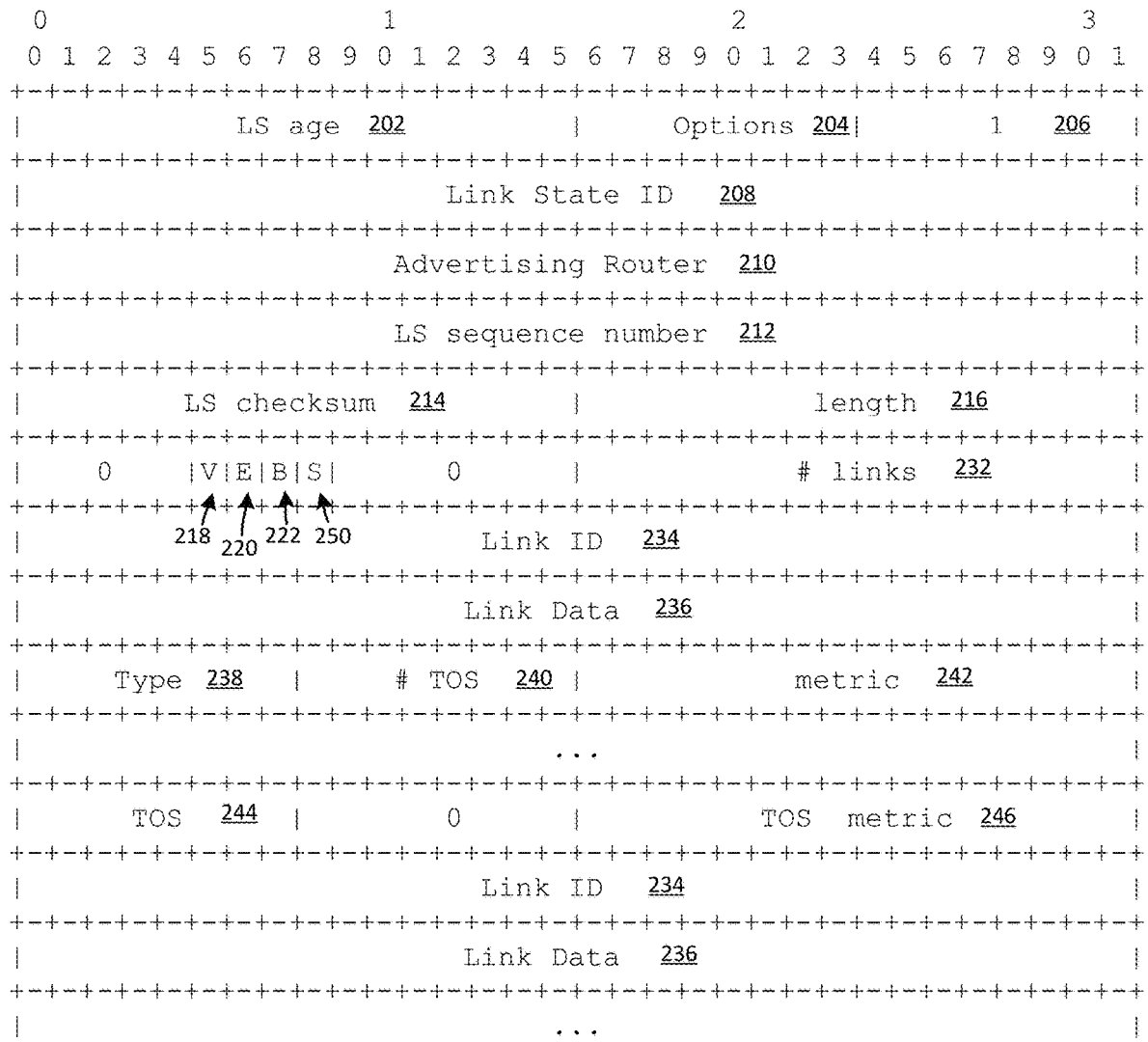
FIG. 2B is a schematic diagram illustrating an OSPFv2 router LSA according to another embodiment of the present disclosure.

FIG. 2B is a schematic diagram illustrating an OSPFv2 router LSA 200B according to an embodiment of the present disclosure. The OSPFv2 router LSA 200B can be communicated by a router, such as R1 in FIG. 1A, to distribute routing information between OSPF nodes. The OSPFv2 router LSA 200B includes all of the same fields as the OSPFv2 router LSA 200A in FIG. 2A except, instead of the new D bit 224, U bit 226, and C bit 230 as shown in FIG. 2A, the OSPFv2 router LSA 200B includes a new S flag 250 that is used to indicate when there is a significant change in the LSA. In an embodiment, a significant change can be either a link down, a link up, and/or a link metric change.

Figure 3A:
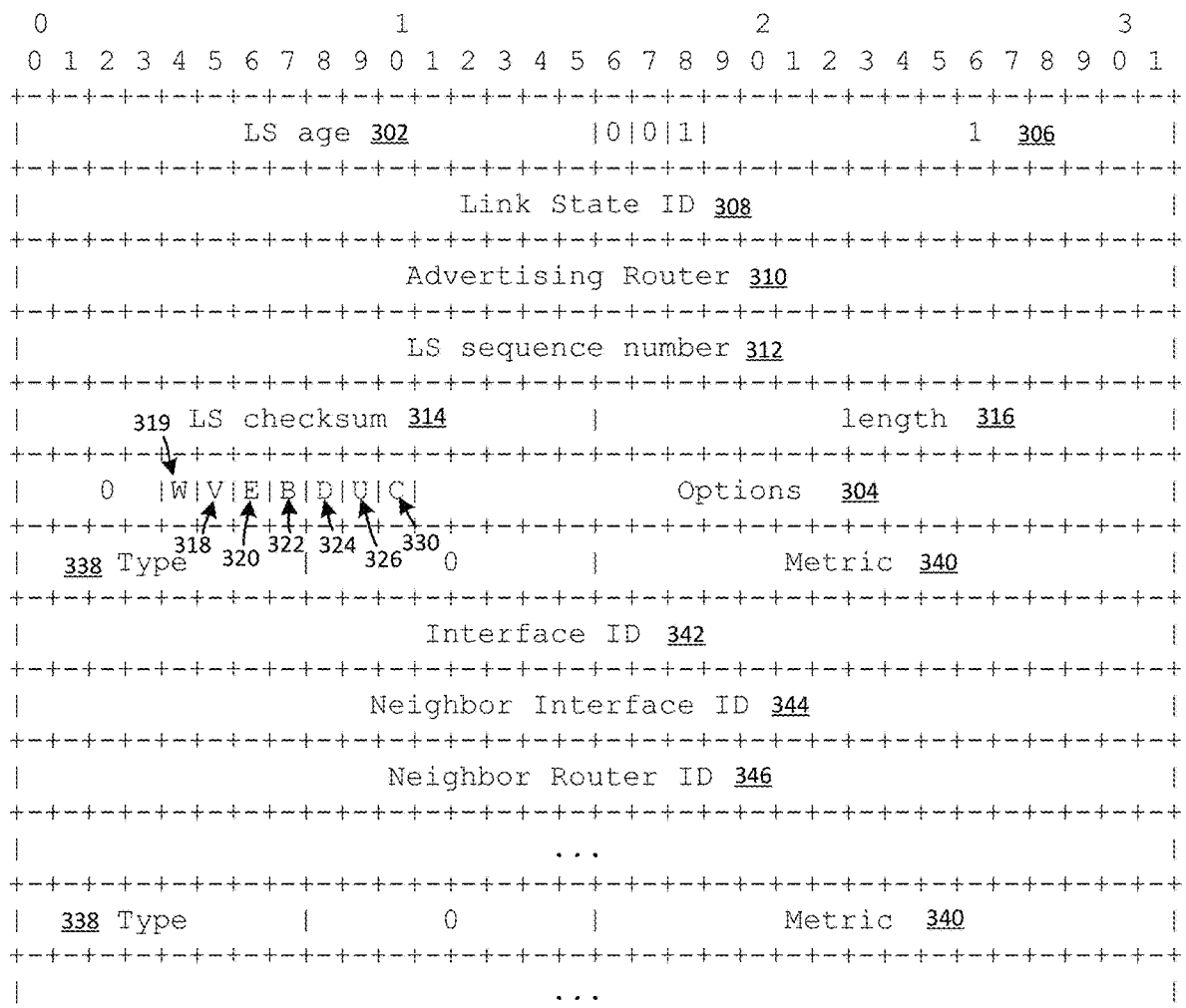
FIG. 3A is a schematic diagram illustrating an OSPF version 3 (OSPFv3) router LSA according to an embodiment of the present disclosure.

FIG. 3A is a schematic diagram illustrating an OSPF version 3 (OSPFv3) router LSA 300A according to an embodiment of the present disclosure. OSPFv3 supports version 6 of the Internet Protocol (IPv6). The OSPFv3 router LSA 300A can be communicated by a router, such as R1 in FIG. 1A, to distribute routing information between OSPF nodes.

The OSPFv3 router LSA 300A includes a standard LSA header, which includes a LS age field 302, an Options field 304, a LS Type field 306 of type 1, an Link State ID field 308, an Advertising Router field 310, an LS sequence number field 312, a LS checksum field 314, and a Length field 316.

The LS age field 302 contains the age of the OSPFv3 router LSA 300A advertisement in seconds to enable old advertisements to be flushed from the routing domain. The Options field 304 can be used to specify one or more OSPFv3 options. The Options field 304 has been removed from the standard 20-byte LSA header (as shown for OSPFv2 in FIG. 2) and moved into the body of the router-LSA. The Options field 304 can be used to specify one or more OSPFv3 options. The Options field 304 enables OSPF routers to support (or not support) optional capabilities, and to communicate their capability level to other OSPF routers.

The LS Type field 306 is used to indicate the type of the LSA. In the depicted embodiment, a 1 is depicted in the LS Type field 306 to indicate that the LSA is a router-LSA. As stated above, each router in an area originates a router-LSA. Router-LSAs have area flooding scope. The router-LSA describes the state and cost of the router's links (i.e., interfaces) to the area.

A router may originate one or more router-LSAs for a given area. The Link State ID field 308 serves as a way to differentiate multiple LSAs originated by the same router. Each router-LSA contains an integral number of interface descriptions. Taken together, the collection of router-LSAs originated by the router for an area describes the collected states of all the router's interfaces attached to the area. When multiple router-LSAs are used, they are distinguished by their Link State ID field 308.

The Advertising Router field 310 contains the router ID of the router that originated the OSPFv3 router LSA 300A. The LS sequence number field 312 contains successive sequence numbers that are used to detect old or duplicate LSAs. The LS checksum field 314 contains a checksum of the complete contents of the OSPFv3 router LSA 300A including the LSA header, but excluding the LS age field 302. The Length field 316 represents the total length (in octets) of the OSPFv3 router LSA 300A.

The OSPFv3 router LSA 300A includes a virtual link endpoint (V) bit 318, an external (E) bit 320, and a border (B) bit 322. When the V bit 318 is set, the router is an endpoint of one or more fully adjacent virtual links having the described area as Transit area. When the E bit 320 is set, the router is an AS boundary router. When the B bit 322 is set, the router is an area border router. The Options field 304, V bit 318, E bit 320, and B bit 322 should be the same in all router-LSAs from a single originator. The W bit 319 in the OSPFv3 Router Properties is no longer used.

Similar to the OSPFv2 router LSA 200A in FIG. 2A, the OSPFv3 router LSA 300A includes three new bits, a Down (D) bit 324, an Up (U) bit 326, and a Change (C) bit 330. In an embodiment, when the D bit 324 is set to one (1), this indicates that the router LSA contains a link down (i.e., an old link removed). In other words, a link that was included in a prior LSA is not included in the current LSA. When the D bit 324 remains set to zero (0), this indicates that the router LSA does not contain any link down. In an embodiment, when the U bit 326 is set to one (1), this indicates that the router LSA contains a link up (i.e., a new link). When the U bit 326 remains set to zero (0), this indicates that the router LSA does not contain any link up. In an embodiment, when the C bit 330 is set to one (1), this indicates that the router LSA contains a link metric change. When the C bit 330 remains set to zero (0), this indicates that the router LSA does not contain any link metric change.

Type field 338 indicates a router link type. For instance, link type 1 is a point-to-point connection to another router, link type 2 is a connection to a transit network, link type 3 is currently reserved, and link type 4 is a virtual link. The Metric field 340 indicates the cost of using this router interface for outbound traffic. The Interface ID field 342 indicates the Interface ID assigned to the interface being described.

The Neighbor Interface ID field 344 indicates the Interface ID of the neighbor router that is associated with the link, as advertised in the neighbor's Hello packets. For transit (type 2) links, the link's Designated Router is the neighbor described. For other link types, the sole adjacent neighbor is described. The Neighbor Router ID field 346 indicates the Router ID the of the neighbor router.

Figure 3B:
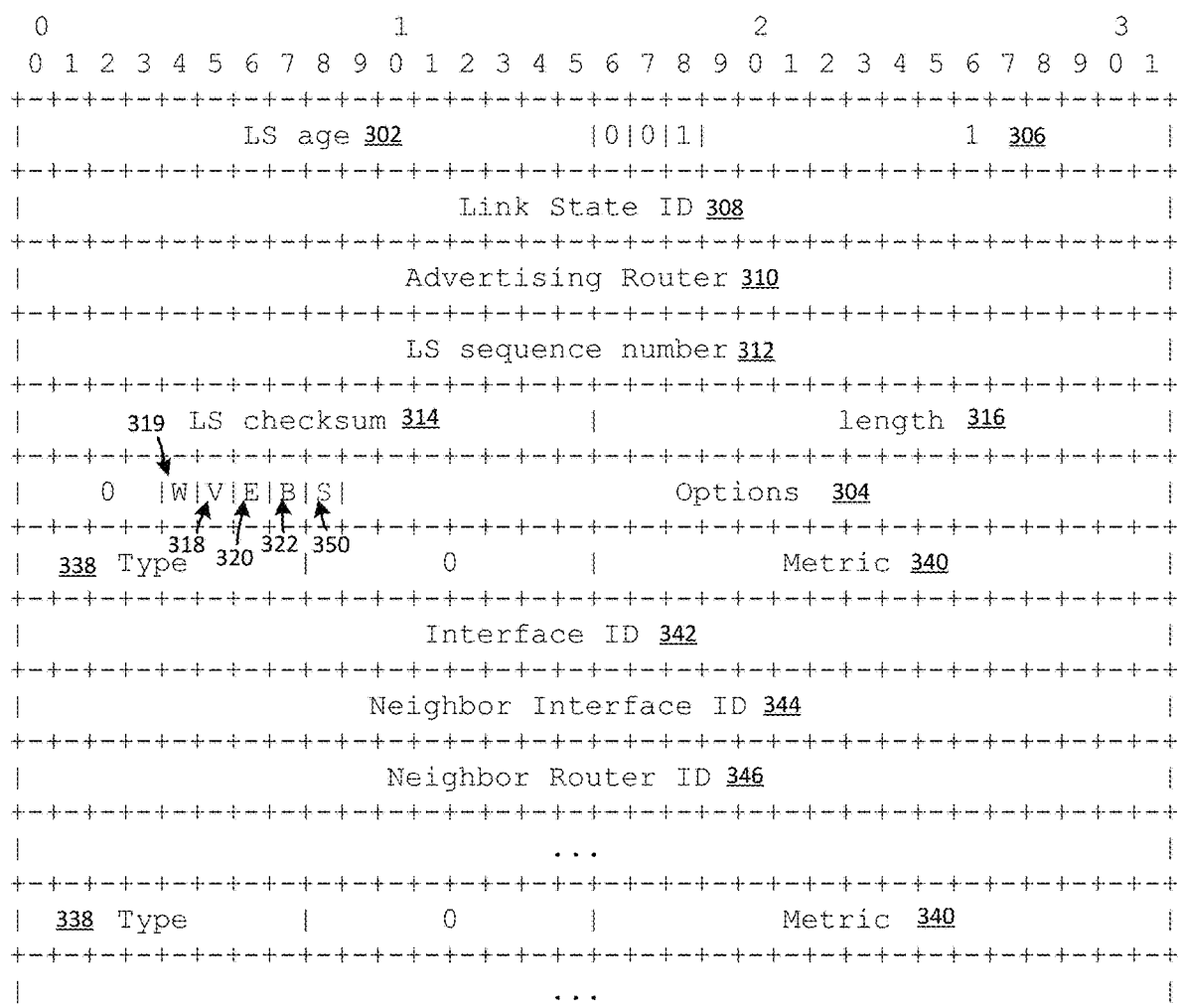
FIG. 3B is a schematic diagram illustrating an OSPFv3 router LSA according to another embodiment of the present disclosure.

FIG. 3B is a schematic diagram illustrating an OSPFv3 router LSA 300B according to an embodiment of the present disclosure. The OSPFv3 router LSA 300B can be communicated by a router, such as R1 in FIG. 1A, to distribute routing information between OSPF nodes.

The OSPFv3 router LSA 300B includes all of the same fields as the OSPFv3 router LSA 300A in FIG. 3A except, instead of the new D bit 324, U bit 326, and C bit 330 as shown in FIG. 3A, the OSPFv3 router LSA 300B includes a new S flag 350 that is used to indicate when there is a significant change in the LSA. In an embodiment, a significant change can be either a link down, a link up, and/or a link metric change.

Figure 4A:
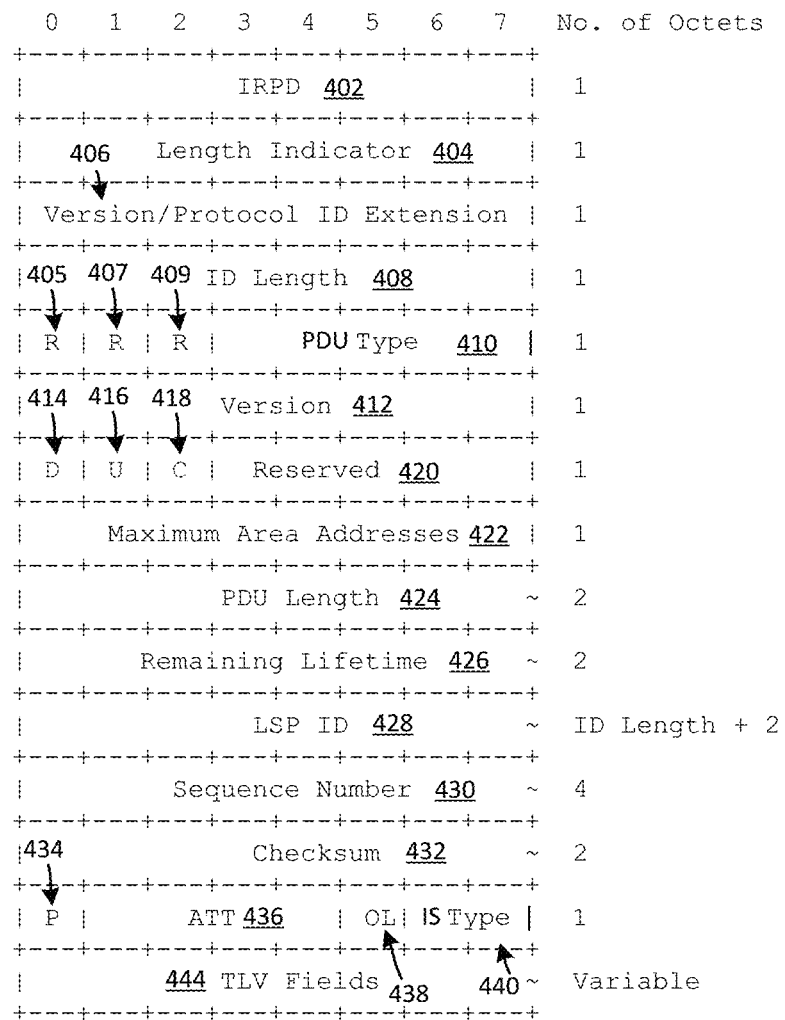
FIG. 4A is a schematic diagram illustrating an IS-IS LSP according to an embodiment of the present disclosure.

FIG. 4A is a schematic diagram illustrating an IS-IS LSP 400A according to an embodiment of the present disclosure. The IS-IS LSP 400A can be communicated by a router, such as IS 102 in FIG. 1B, to distribute routing information between IS-IS nodes.

In the depicted embodiment, the IS-IS LSP 400A includes an Intradomain Routing Protocol Discriminator (IRPD) field 402, a Length Indicator field 404, a Version/Protocol ID Extension field 406, an ID Length field 408, a protocol data unit (PDU) Type field 410, a Version field 412, a Reserved field 420, a Maximum Area Addresses field 422, a PDU Length field 424, a Remaining Lifetime field 426, a LSP ID field 428, a Sequence Number field 430, a Checksum field 432, a Partition (P) field 434, an Attached (ATT) field 436, an overload (OL) field 438, an IS type field 440, and a Type-Length-Value (TLV) fields 444. The IS-IS LSP 400A includes three reserved (R) bits R bit 405, R bit 407, and R bit 409.

The IRPD field 402 contains the network-layer identifier assigned to IS-IS in ISO 9577; its binary value is 10000011 (0x83). The Length Indicator field 404 specifies the length of the fixed header in octets. The Version/Protocol ID Extension field 406 currently has value of one (1). The ID Length field 408 specifies the length of the system ID field. The ID Length field 408 must be the same for all nodes in the domain. The PDU Type field 410 contains the PDU Type Number indicating the type of PDU (e.g., decimal values 18 and 20 for Level 1 and Level 2 LSPs, respectively). The Version field 412 contains the version of the PDU. The Reserved field 420 contains reserved bits that are transmitted as zero, and ignored on receipt. In one embodiment, three new flags, D bit 414, U bit 416, and C bit 418, are defined in the Reserved field 420. The D bit 414, U bit 416, and C bit 418 can be set as described above in FIG. 2A to indicate when the IS-IS LSP 400A contains a link down, a link up, and/or a link metric change. For IS-IS, four types of metrics are defined in request for comments (RFC) 1142: default metric, delay metric, expense metric, and error metric.

The Maximum Area Addresses field 422 indicates the number of area addresses permitted for this IS area. The PDU Length field 424 indicates the length of the entire PDU, fixed header, and TLVs. The Remaining Lifetime field 426 indicates the time in seconds before the IS-IS LSP 400A expires. The LSP ID field 428 consists of three components: system ID, pseudonode ID, and LSP fragmentation number. The Sequence Number field 430 contains successive sequence numbers that is used to detect old or duplicate LSAs. The Checksum field 432 indicates the checksum of the contents of the IS-IS LSP 400A. The P field 434 is set to indicate that the originator of the IS-IS LSP 400A supports partition repair. The ATT field 436 is set to indicate that the originator is attached to another area using the referred metric indicated in the ATT field 436. The OL field 438 is set to indicate that the originator's LSP database is overloaded and should be circumvented in path calculations to other destinations. The IS type field 440 indicates the IS type. For example, if only bit 1 of the IS type field 440 is set, this indicates a Level 1 IS type. If both bits of the IS type field 440 are set, it indicates a Level 2 IS type. The TLV fields 444 contains any TLVs (i.e., optional information elements) carried by the IS-IS LSP 400A.

Figure 4B:
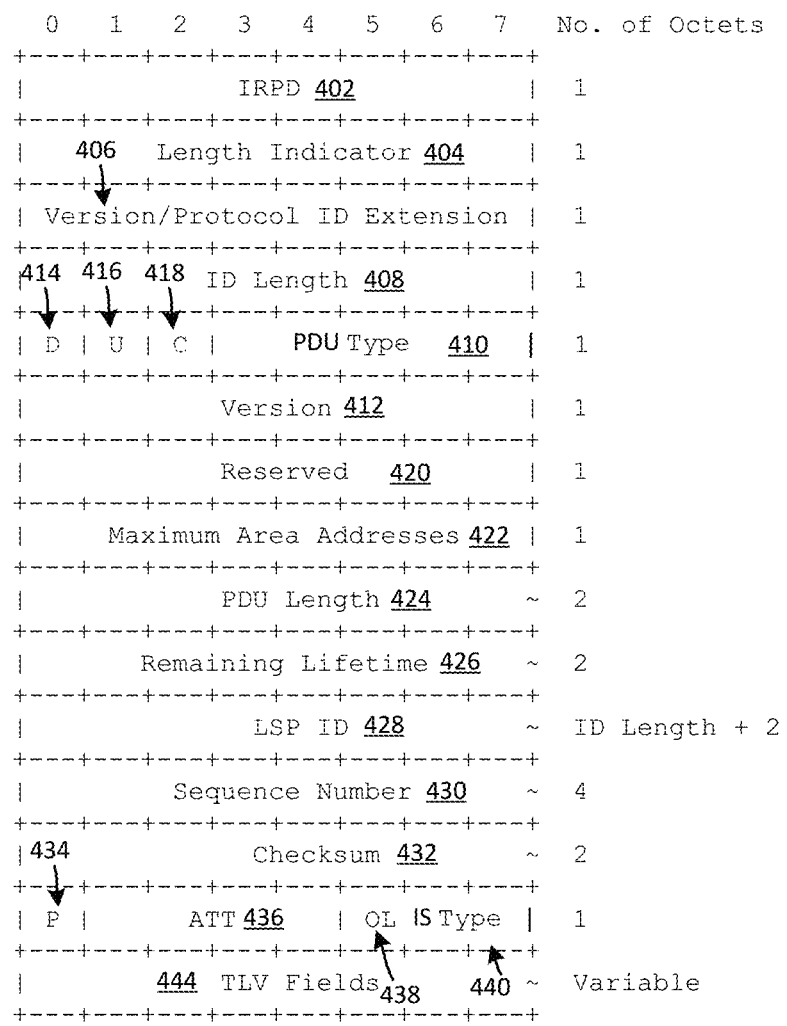
FIG. 4B is a schematic diagram illustrating an IS-IS LSP according to another embodiment of the present disclosure.

FIG. 4B is a schematic diagram illustrating an IS-IS LSP 400B according to another embodiment of the present disclosure. The IS-IS LSP 400B can be communicated by a router, such as IS 102 in FIG. 1B, to distribute routing information between IS-IS nodes. The IS-IS LSP 400B contains the same fields as the IS-IS LSP 400A in FIG. 4A, except the IS-IS LSP 400B uses the three reserved bits R bit 405, R bit 407, and R bit 409 in the IS-IS LSP 400A as shown in FIG. 4A, for the three new flags, the D bit 414, the U bit 416, and the C bit 418 as illustrated in FIG. 4B to indicate when the IS-IS LSP 400B contains a link down, a link up, and/or a link metric change, respectively.

Figure 4C:
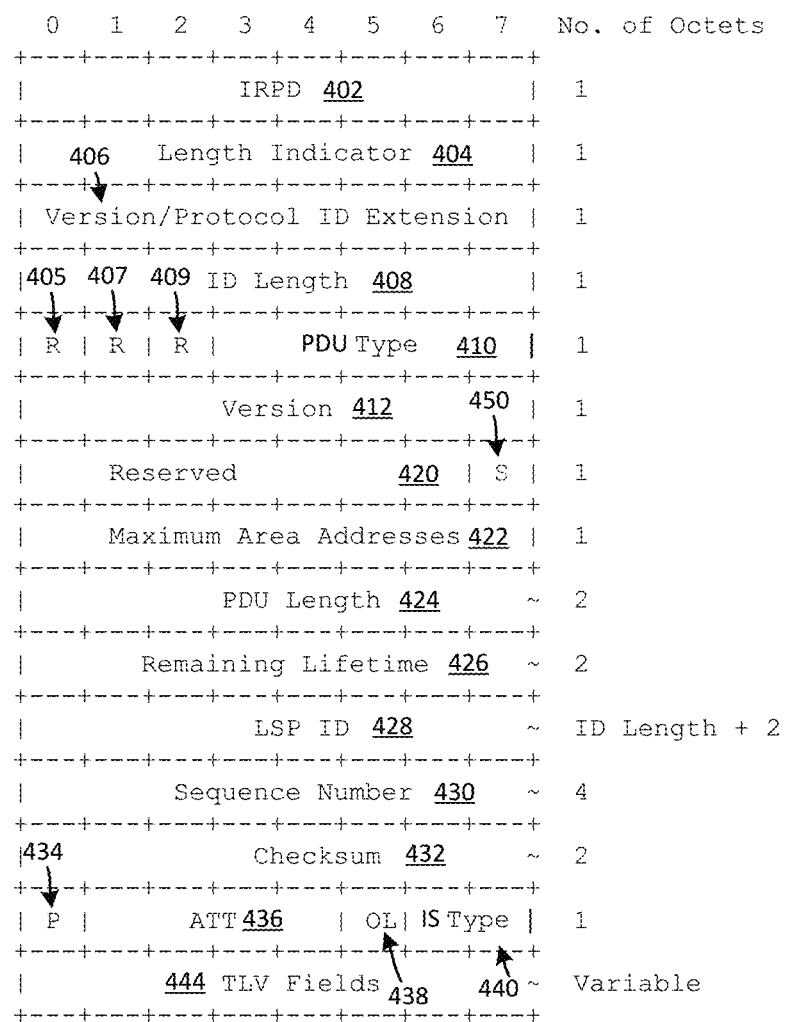
FIG. 4C is a schematic diagram illustrating an IS-IS LSP according to another embodiment of the present disclosure.

FIG. 4C is a schematic diagram illustrating an IS-IS LSP 400C according to another embodiment of the present disclosure. The IS-IS LSP 400C can be communicated by a router, such as IS 102 in FIG. 1B, to distribute routing information between IS-IS nodes. The IS-IS LSP 400C contains the same fields as the IS-IS LSP 400A in FIG. 4A, except, instead of the new D bit 414, U bit 416, and C bit 418 as shown in FIG. 4A, the IS-IS LSP 400C includes a new S flag 450 that is used to indicate when there is a significant change in the IS-IS LSP 400C. In an embodiment, a significant change can be either a link down, a link up, and/or a link metric change.

Figure 5:
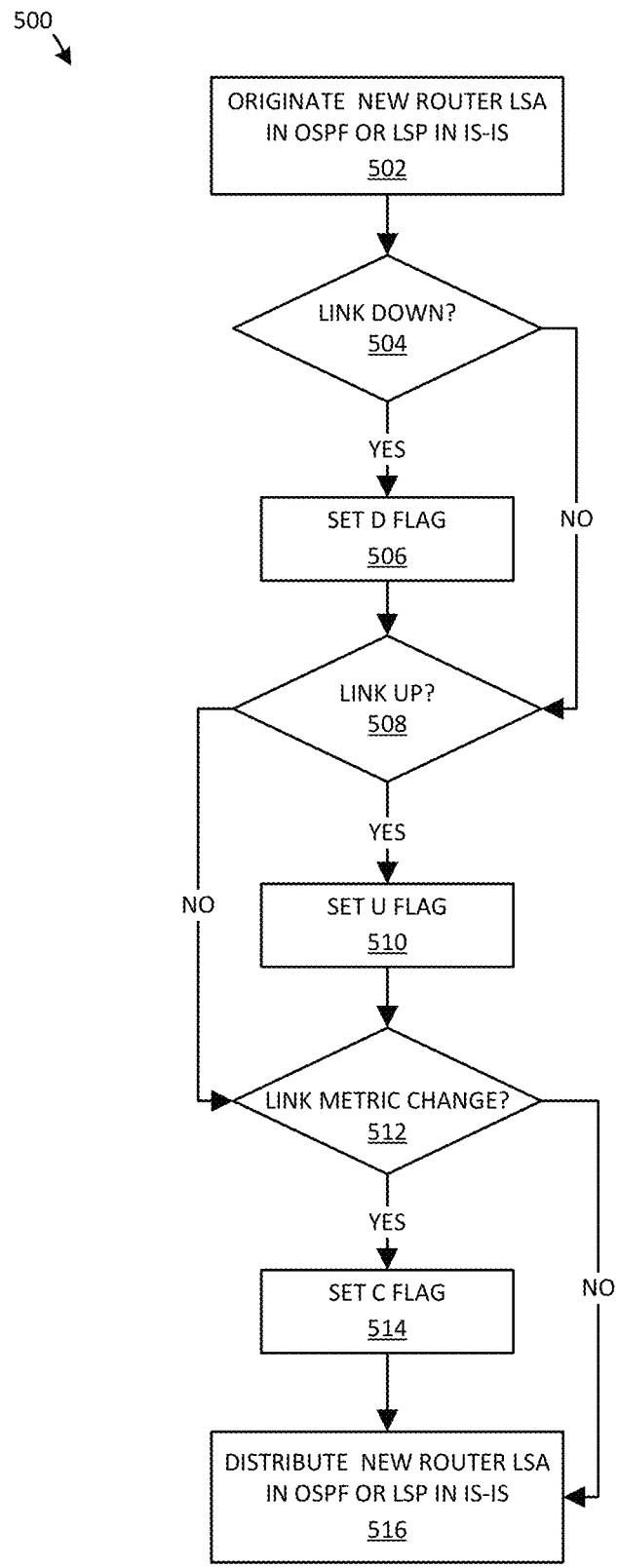
FIG. 5 is a flowchart illustrating a process for generating a new router LSA in OSPF or a new LSP in IS-IS according to an embodiment of the present disclosure.

FIG. 5 is a flowchart illustrating a process 500 for generating a new router LSA in OSPF or a new LSP in IS-IS according to an embodiment of the present disclosure. The process 500 can be performed by any network node such as, but not limited to, R1 in FIG. 1A or IS 102 in FIG. 1B. The process 500 begins at step 502 by originating a new router LSA in OSPF (e.g., FIGS. 2A-B and FIGS. 3A-B) or a new LSP in IS-IS (e.g., FIGS. 4A-C). At step 504, the process 500 determines whether there is a link down in the new router LSA/new LSP. If the process 500 determines that there is a link in a previous router LSA/previous LSP originated by the network node that is not in the new router LSA/new LSP, then the process 500, at step 506, sets a D flag in the new router LSA/new LSP to one to indicate that there is a link down; otherwise the D flag remains set to zero. At step 508, the process 500 determines whether there is a link up in the new router LSA/new LSP that was not in a previous router LSA/previous LSP originated by the network node. If the process 500 determines that there is a new link in the new router LSA/new LSP, then the process 500, at step 510, sets a U flag in the new router LSA/new LSP to one to indicate that there is a link up; otherwise the U flag remains set to zero. At step 512, the process 500 determines whether there is a link metric change in the new router LSA/new LSP that was not in a previous router LSA/previous LSP originated by the network node. If the process 500 determines that there is a link metric change in the new router LSA/new LSP, then the process 500, at step 514, sets a C flag in the new router LSA/new LSP to one to indicate that there is a link metric change; otherwise the C flag remains set to zero. At step 516, the process 500 distributes the new router LSA/new LSP to other routers in the OSPF/IS-IS area, with the process 500 terminating thereafter. In an embodiment, the order of steps in the process 500 may be changed (e.g., the link up 508 may be determined prior to the link down 504).

Figure 6:
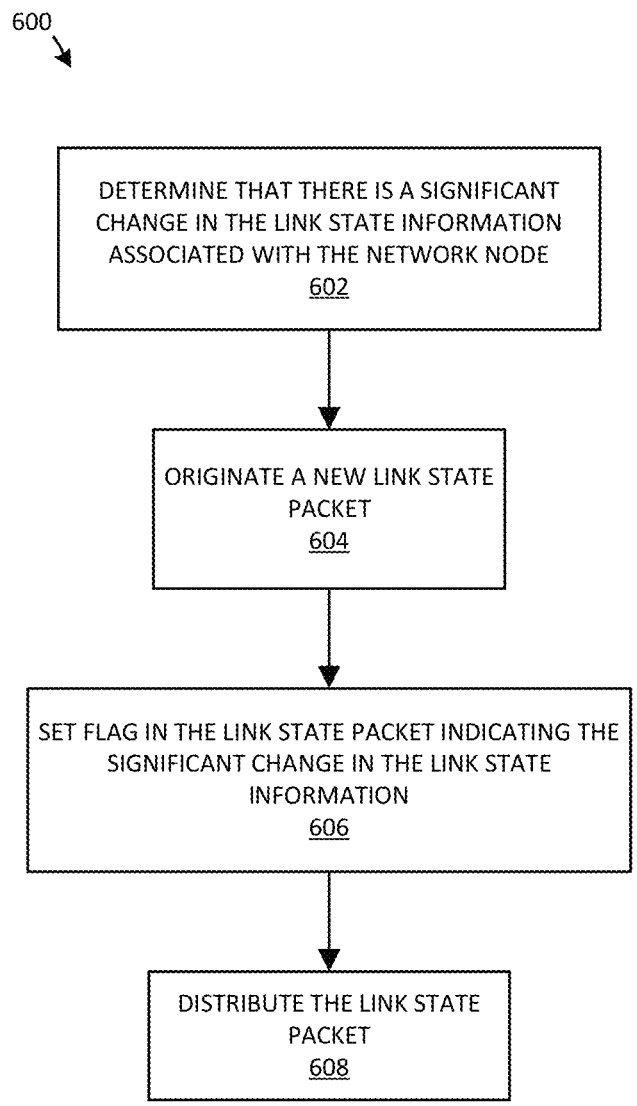
FIG. 6 is a flowchart illustrating a process for generating a new router LSA in OSPF or a new LSP in IS-IS according to another embodiment of the present disclosure.

FIG. 6 is a flowchart illustrating a process 600 for generating a link state packet n according to an embodiment of the present disclosure. The process 600 can be performed by any network node such as, but not limited to, R1 in FIG. 1A or IS 102 in FIG. 1B. The process 600 begins, at step 602, by determining that there is a significant change in the link state information associated with the network node. In an embodiment, a significant change can be a link down (e.g., link attached to node failed due to a network failure or due to a failure of a second node attached to the link), a link up (e.g., a new adjacency is formed with the node), and/or a link metric change. In an embodiment, the process 600 can determine the significant change by detecting the current active links associated with network node and compare it to previous link state information of the network node stored in the LSDB of the network node. For example, if there is a current active link that is not in the LSDB of the network node, then there is a link up (i.e., new link) associated with the network node. Similarly, if there is a link in the LSDB of the network node that is not a current active link associated with the network node, then there is a link down.

At step 604, the process 600 originates a new link state packet such as a router LSA in OSPF (e.g., FIGS. 2A-B and FIGS. 3A-B) or a LSP in IS-IS (e.g., FIGS. 4A-C). At step 606, the process 600 sets a flag in the link state packet indicating the significant change in the link state information. In an embodiment, the flag is an "S" flag that is set to one to indicate that there is a significant change in the link state information associated with network node. Alternatively, the flag may be more specific indicating a particular type of significant change. As examples, in an embodiment, a "D" flag is set to one to indicate that there is a link down, a "U" flag is set to one to indicate that there is a link up, and a "C" flag is set to one to indicate that there is a link metric change. The process 600, at step 608, distributes the new link state packet containing the "S" flag (or the "D" flag, "U" flag, and "C" flag) indicating the significant change in the link information to other routers in the area, with the process 600 terminating thereafter.

Figure 7:
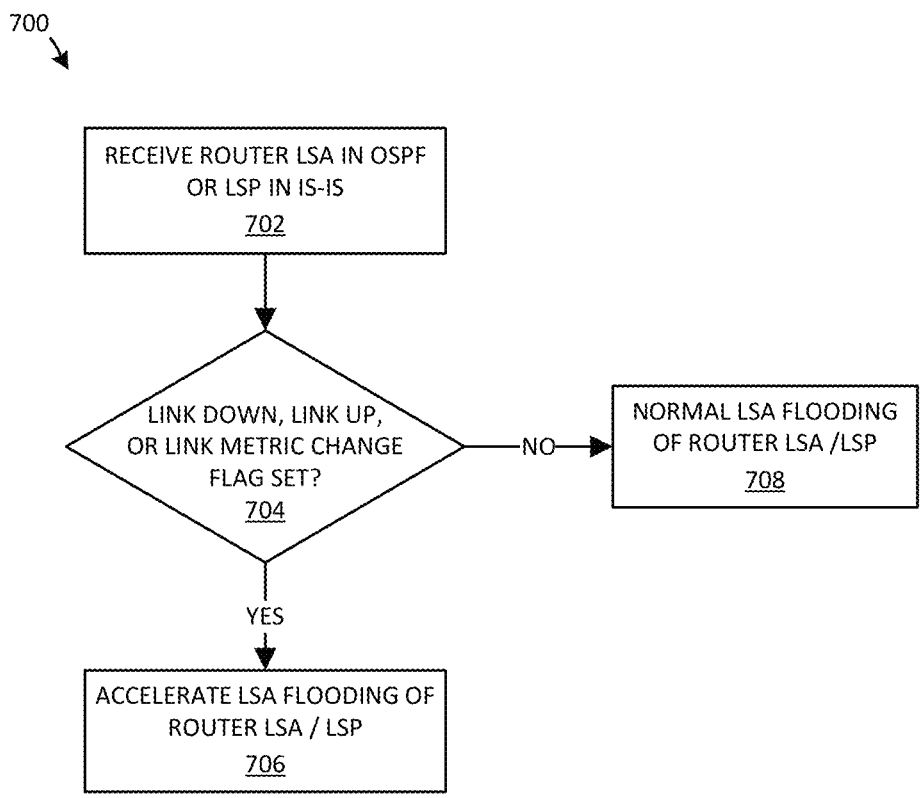
FIG. 7 is a flowchart illustrating a process for processing a router LSA in OSPF or a LSP in IS-IS according to an embodiment of the present disclosure.

FIG. 7 is a flowchart illustrating a process 700 for processing a router LSA in OSPF or a LSP in IS-IS according to an embodiment of the present disclosure. The process 700 can be performed by any network node such as, but not limited to, R1 in FIG. 1A or IS 102 in FIG. 1B. The process 700 begins at step 702 by receiving a router LSA in OSPF or by receiving a LSP in IS-IS as described in FIGS. 2A-2B, FIGS. 3A-3b, and FIGS. 4A-4C. At step 704, the process 700 determines whether a link down flag, a link up flag, and/or a link metric change flag is set in the received router LSA/received LSP (e.g., D flag, U flag, or C flag set to one as described in FIG. 5). If the process 700 determines that the link down flag, the link up flag, and the link metric change flag are not set in the received router LSA/received LSP, the process 700 performs normal router LSA flooding of the received router LSA/received LSP, at step 708. If the process 700, at step 704, determines that at least one of the link down flag, the link up flag, or the link metric change flag is set in the received router LSA/received LSP, the process 700 performs accelerated router LSA flooding of the received router LSA/received LSP, at step 706. The accelerated router LSA flooding processes the received router LSA/received LSP in a faster manner such that the received router LSA/received LSP is moved forward faster until the received router LSA/received LSP is flooded (i.e., sent) to all the neighbors except for the one from which the LSA/LSP is received.

In various embodiments, the accelerated router LSA/LSP flooding process can include determining whether an LSA is a router LSA as soon as it is received by the router (this first step is not required for a LSP), and if so, determining whether the router LSA or LSP has a significant change (e.g., D flag, U flag, C flag, or S flag set to one as described in FIGS. 5-6). If the router LSA/LSP has a significant change, the router can delay the (time-consuming) validation of the LSA's/LSP's LS checksum until after the LSA/LSP is flooded (i.e., sent) to the other neighbors. The validation of the LSA's/LSP's LS checksum is performed before the LSA/LSP is installed in the link state database. In some embodiments, the router can utilize a special code path to process the router LSA/LSP having a significant change. This special code path is faster or is the fastest way to move the LSA/LSP forward until the LSA is flooded.

In an alternative embodiment, the router just processes the router LSA/LSP having a down link flag (e.g., a D flag) set to one in a faster way. In this embodiment, when a router receives a router LSA/LSP from an interface, the router checks if the LSA/LSP has the D flag set to one. If the D flag is set to one, the router process the LSA/LSP in a faster way such that the LSA/LSP is moved forward faster until the LSA/LSP is flooded to all the neighbors except for the one from which the LSA/LSP is received.

In another alternative embodiment, the router just processes the router LSA/LSP having a significant change flag (e.g., an S flag) set to one in a faster way. When a router receives a router LSA/LSP from an interface, the router checks if the LSA/LSP has the S flag set to one. If the S flag is set to one, the router process the LSA/LSP in a faster way such that the LSA/LSP is moved forward faster until the LSA/LSP is flooded to all the neighbors except for the one from which the LSA/LSP is received.

Figure 8:
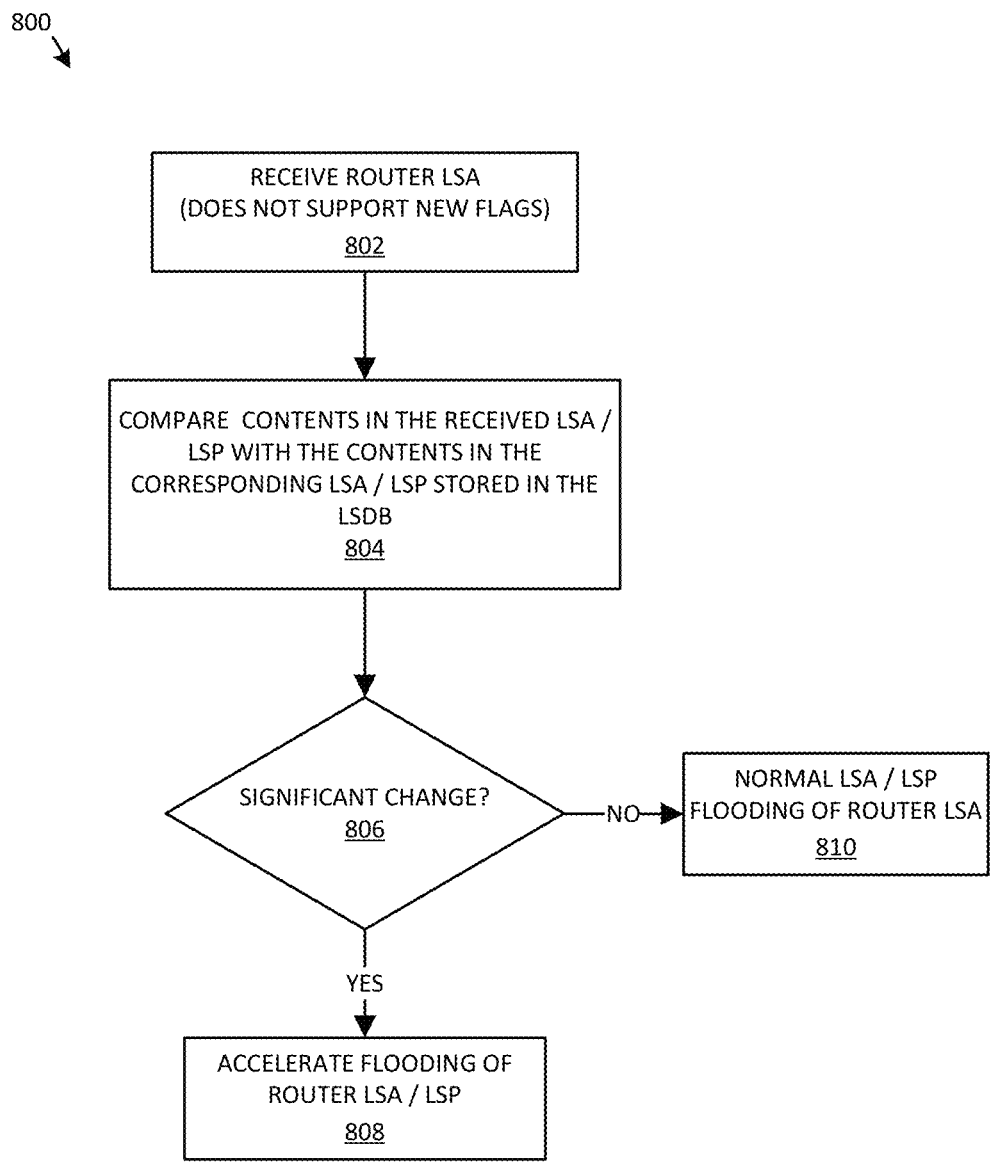
FIG. 8 is a flowchart illustrating a process for processing a router LSA in OSPF or a LSP in IS-IS according to another embodiment of the present disclosure.

FIG. 8 is a flowchart illustrating a process 800 for processing a router LSA in OSPF or a LSP in IS-IS according to an embodiment of the present disclosure. The process 800 can be performed by any network node such as, but not limited to, R1 in FIG. 1A or IS 102 in FIG. 1B. The process 800 begins at step 802 by receiving a router LSA/LSP that does not employ any new flags for indicating a significant change (e.g., no D flag, U flag, C flag, or S flag as described in FIGS. 2A-2B, FIGS. 3A-3b, and FIGS. 4A-4C). The process 800, at step 804, compares the contents in the received router LSA/received LSP to the contents in the corresponding LSA stored in a link-state database (LSDB). The LSDB contains each LSA/LSP received by a router. Based on the comparison, the process 800, at step 806, determines whether there is a significant change between the contents in the corresponding LSA/LSP stored in the LSDB and the received router LSA/received LSP. In an embodiment, a significant change can be a link down, a link up, or a link metric change as described above. For example, if there is a link in the LSA/LSP in the LSDB and this link is not in the received router LSA/received LSP, then there is a link down in the received router LSA/received LSP, which is equivalent to the D flag being set to one. In an embodiment, a link down in the received router LSA/received LSP can be determined by comparing the number of links field in the received router LSA/received LSP and the corresponding field in the LSA/LSP in the LSDB. If the number of links in the received router LSA/received LSP is less than that in the LSA/LSP in the LSDB, then there is a link down in the received router LSA/received LSP.

Similarly, if there is a link in the received router LSA/received LSP and this link is not in the LSA/LSP in the LSDB, then there is a link up in the received router LSA/received LSP, which is equivalent to the U flag being set to one. In an embodiment, a link up in the received router LSA/received LSP can be determined by comparing the number of links field in the received router LSA/received LSP and the corresponding field in the LSA/LSP in the LSDB. If the number of links in the received router LSA/received LSP is greater than that in the LSA/LSP in the LSDB, then there is a link up in the received router LSA/received LSP.

Additionally, if there is a link having a cost or metric in the received router LSA/received LSP and the cost or metric is not equal to the cost or metric of the same link in the LSA/LSP in the LSDB, then there is a link change in the received router LSA/received LSP, which is equivalent to the C flag being set to one.

If the process 800, at step 806, determines that there is no significant change between the contents in the corresponding LSA/LSP stored in the LSDB and the received router LSA/received LSP, the process 800, at step 810, performs normal router LSA/LSP flooding of the received router LSA/received LSP. If the process 800, at step 806, determines that there is a significant change between the contents in the corresponding LSA stored in the LSDB and the received router LSA/received LSP, the process 800, at step 808, performs accelerated router LSA flooding of the received router LSA/received LSP. A normal flooding procedure is described in FIG. 10. An accelerated flooding procedure is described in FIG. 11.

Figure 9:
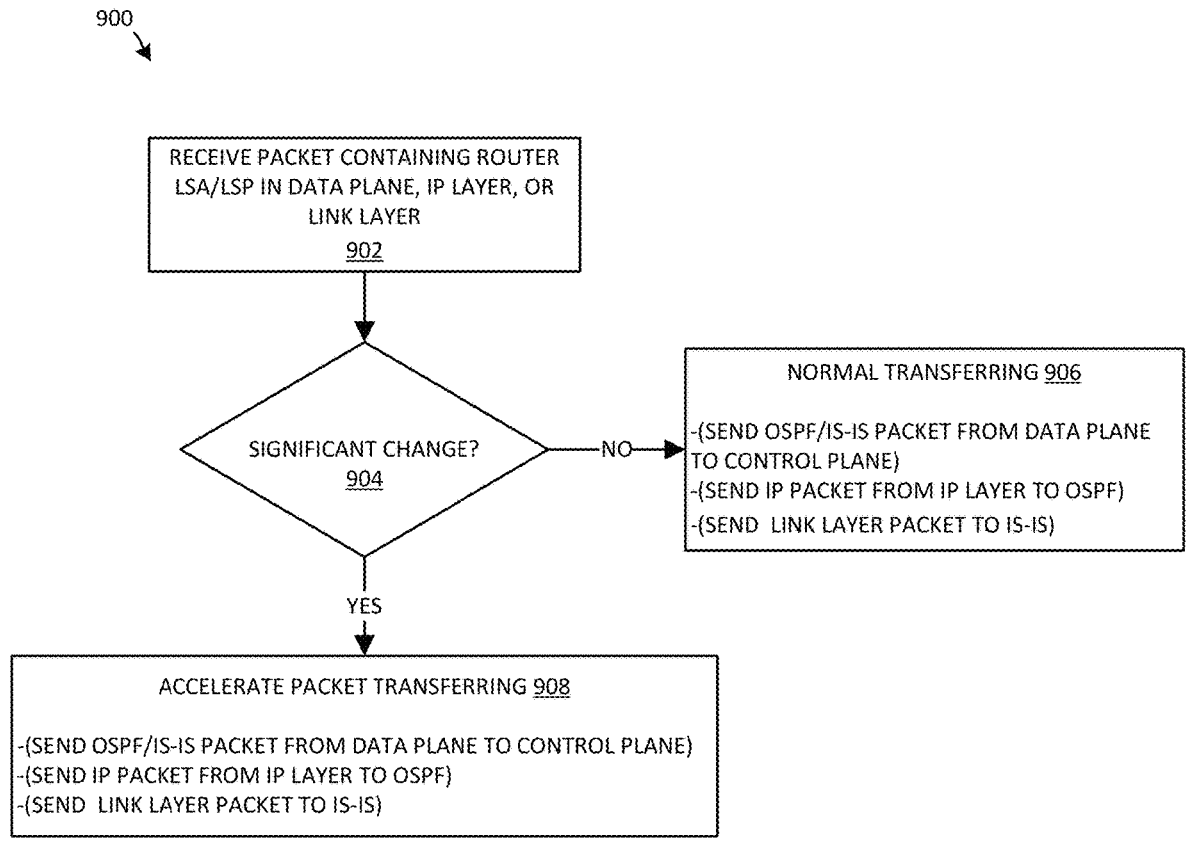
FIG. 9 is a flowchart illustrating a process for processing a packet according to an embodiment of the present disclosure.

FIG. 9 is a flowchart illustrating a process 900 for processing a packet according to an embodiment of the present disclosure. The process 900 can be performed by any network node such as, but not limited to, R1 in FIG. 1A or IS 102 in FIG. 1B. The process 900 begins at step 902 by receiving an OSPF packet in a data plane, an IS-IS packet in a data plane, an IP packet in the IP layer, or a frame (i.e., a link layer packet) in the link layer. The data plane is part of the network layer in a router that determines how datagram arriving on an input port of the router is forwarded to an output port of the router. The Internet layer or IP layer of the TCP/IP model aligns with Layer 3 (i.e., the network layer) of the OSI model. The data link layer, or layer 2, is the second layer of the seven-layer OSI model of computer networking. This layer contains communication protocols that only operate on the link that a host is physically connected to and provide the functional and procedural means to transfer data between network entities.

At step 904, for processing an OSPF packet in the data plane, the process 900 determines whether the OSPF packet contains a router LSA having a significant change; for processing an IS-IS packet in the data plane, the process 900 determines whether the IS-IS packet contains an LSP having a significant change; for processing an IP packet in the IP layer, the process 900 determines whether the IP packet contains an OSPF link state update with a router LSA having a significant change; and for processing a link layer packet in the link layer, the process 900 determines whether the link layer packet contains an LSP having a significant change.

For any of the preceding conditions, a significant change can be determined as described in any of the above embodiments such as determining whether a link down flag (e.g., D flag), link up flag (e.g., U flag), link metric change (e.g., C flag), or a significant change flag (e.g., S flag) is set in the router LSA. A significant change can also be determined as described in FIG. 8 by comparing the contents in the received router LSA and the contents in the corresponding router LSA stored in the LSDB if the OSPF packet is not extended to add/set those the aforementioned flags.

If, at step 904, the process 900 determines that there is no significant change in the received packet, the process 900, at step 906, performs the normal transferring procedure for moving the received packet from the data plane to the control plane for an OSPF packet or an IS-IS packet, from the IP layer to the OSPF for an IP packet, or from the link layer to the IS-IS layer (for a link layer packet).

If, at step 904, the process 900 determines that there is a significant change in the received packet, the process 900, at step 908, performs an accelerated transferring procedure for moving the received packet from the data plane to the control plane for an OSPF packet or an IS-IS packet, from the IP layer to the OSPF for an IP packet, or from the link layer to the IS-IS for a link layer packet. In an embodiment, the accelerated transferring procedure utilizes a special code path to process the packet with a router LSA/LSP having a significant change. This code path is fastest to move the packet forward to the control plane or to the OSPF/IS-IS.

Figure 10:
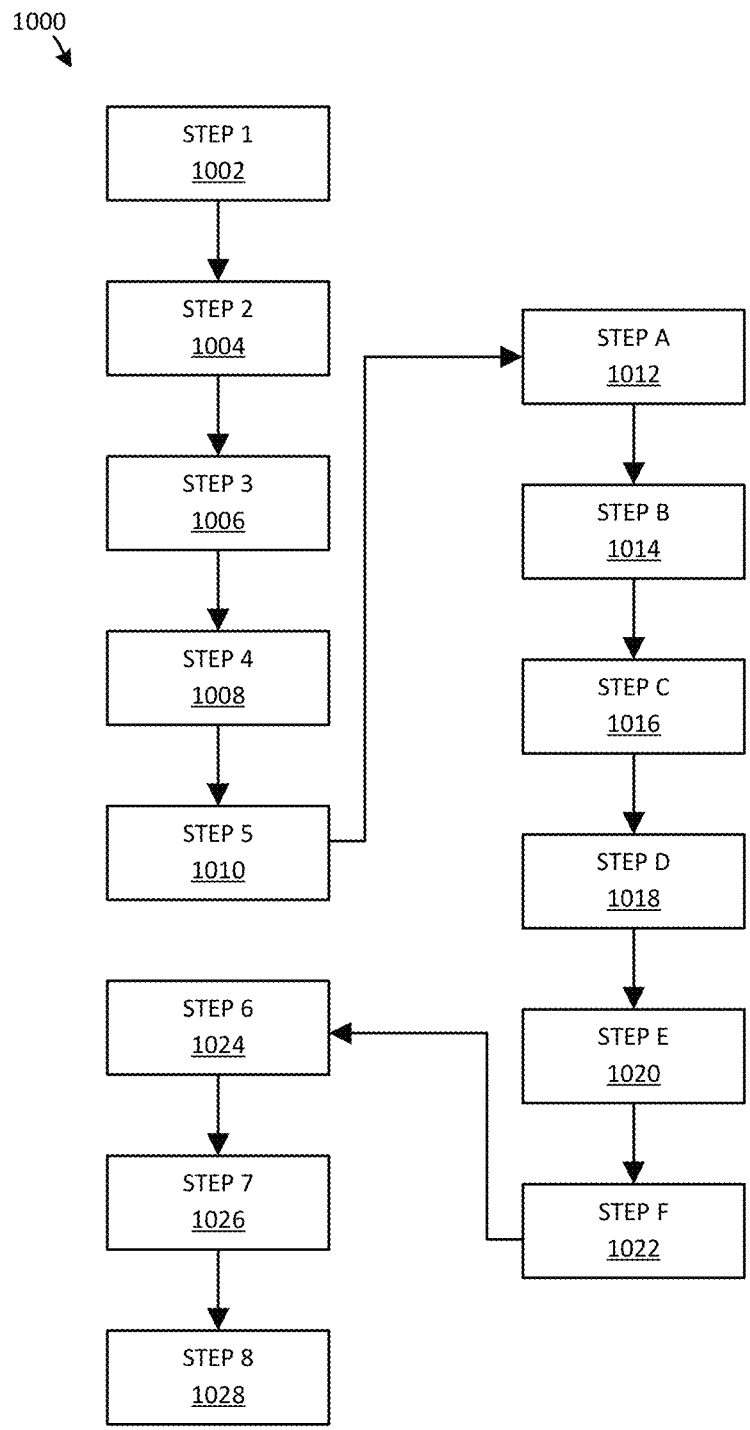
FIG. 10 is a flowchart illustrating a normal flooding procedure.

FIG. 10 is a flowchart illustrating a normal flooding procedure 1000 according to an embodiment of the present disclosure. The normal flooding procedure 1000 can be performed by any network node such as, but not limited to, R1 in FIG. 1A. The normal flooding procedure 1000 starts when a Link State Update packet has been received. A Link State Update packet may contain several distinct LSAs, and each LSA is flooded one hop further from its point of origination.

At step 1 (1002), the normal flooding procedure 1000 validates the LSA's LS checksum. If the checksum turns out to be invalid, the normal flooding procedure 1000 discards the LSA and retrieves the next LSA from the Link State Update packet.

At step 2 (1004), the normal flooding procedure 1000 examines the LSA's LS type. If the LS type is unknown, the normal flooding procedures 1000 discards the LSA and retrieves the next LSA from the Link State Update Packet.

At step 3 (1006), if the LSA is an AS-external-LSA (LS type=5), and the area has been configured as a stub area, the normal flooding procedure 1000 discards the LSA because AS-external-LSAs are not flooded into/throughout stub areas. The normal flooding procedure 1000 then retrieves the next LSA from the Link State Update Packet.

At step 4 (1008), if the LSA's LS age is equal to MaxAge, and there is currently no instance of the LSA in the router's link state database, and none of router's neighbors are in states Exchange or Loading, the normal flooding procedure 1000 takes the following actions: a) Acknowledge the receipt of the LSA by sending a Link State Acknowledgment packet back to the sending neighbor, and b) Discard the LSA and examine the next LSA (if any) listed in the Link State Update packet.

Otherwise (i.e., conditions of step 3 (1006) and step 4 (1008) are not met), at step 5 (1010), the normal flooding procedure 1000 locates the instance of this LSA that is currently contained in the router's link state database. If there is no database copy, or the received LSA is more recent than the database copy, the normal flooding procedure 1000 performs the following steps A-F.

At step A (1012), if there is already a database copy, and if the database copy was received via flooding and installed less than MinLSArrival seconds ago, the normal flooding procedure 1000 discards the new LSA (without acknowledging it) and examines the next LSA (if any) listed in the Link State Update packet.

Otherwise, at step B (1014), normal flooding procedure 1000 immediately floods the new LSA out some subset of the router's interfaces. In some cases the LSA will be flooded back out the receiving interface.

At step C (1016), the normal flooding procedure 1000 removes the current database copy from all neighbors' Link state retransmission lists.

At step D (1018), the normal flooding procedure 1000 installs the new LSA in the link state database (replacing the current database copy). This may cause the routing table calculation to be scheduled. In addition, the normal flooding procedure 1000 timestamps the new LSA with the current time (i.e., the time it was received). In an embodiment, the flooding procedure cannot overwrite the newly installed LSA until MinLSArrival seconds have elapsed.

At step E (1020), the normal flooding procedure 1000 may acknowledge the receipt of the LSA by sending a Link State Acknowledgment packet back out the receiving interface.

At step F (1022), if this new LSA indicates that it was originated by the receiving router itself (i.e., is considered a self-originated LSA), the normal flooding procedure 1000 must take special action to either update the LSA or in some cases flush it from the routing domain.

At step 6 (1024), if there is an instance of the LSA on the sending neighbor's Link state request list, an error has occurred in the Database Exchange process. In this case, the normal flooding procedure 1000 restarts the Database Exchange process by generating the neighbor event BadLS-Req for the sending neighbor and stop processing the Link State Update packet.

At step 7 (1026), if the received LSA is the same instance as the database copy (i.e., neither one is more recent), the normal flooding procedure 1000 treats the received LSA as an acknowledgment by removing the LSA from the Link state retransmission list if the LSA is listed in the Link state retransmission list for the receiving adjacency. This is termed an "implied acknowledgment". The normal flooding procedure 1000 may acknowledge the receipt of the LSA by sending a Link State Acknowledgment packet back out the receiving interface.

At step 8 (1028), the normal flooding procedure 1000 determines that the database copy is more recent than the received LSA. If the database copy has LS age equal to MaxAge and LS sequence number equal to MaxSequenceNumber, the normal flooding procedure 1000 simply discards the received LSA without acknowledging it. Otherwise, as long as the database copy has not been sent in a Link State Update within the last MinLSArrival seconds, the normal flooding procedure 1000 sends the database copy back to the sending neighbor, encapsulated within a Link State Update Packet. The Link State Update Packet should be sent directly to the neighbor. In so doing, the normal flooding procedure 1000 does not put the database copy of the LSA on the neighbor's link state retransmission list, and does not acknowledge the received (less recent) LSA instance.

Figure 11:
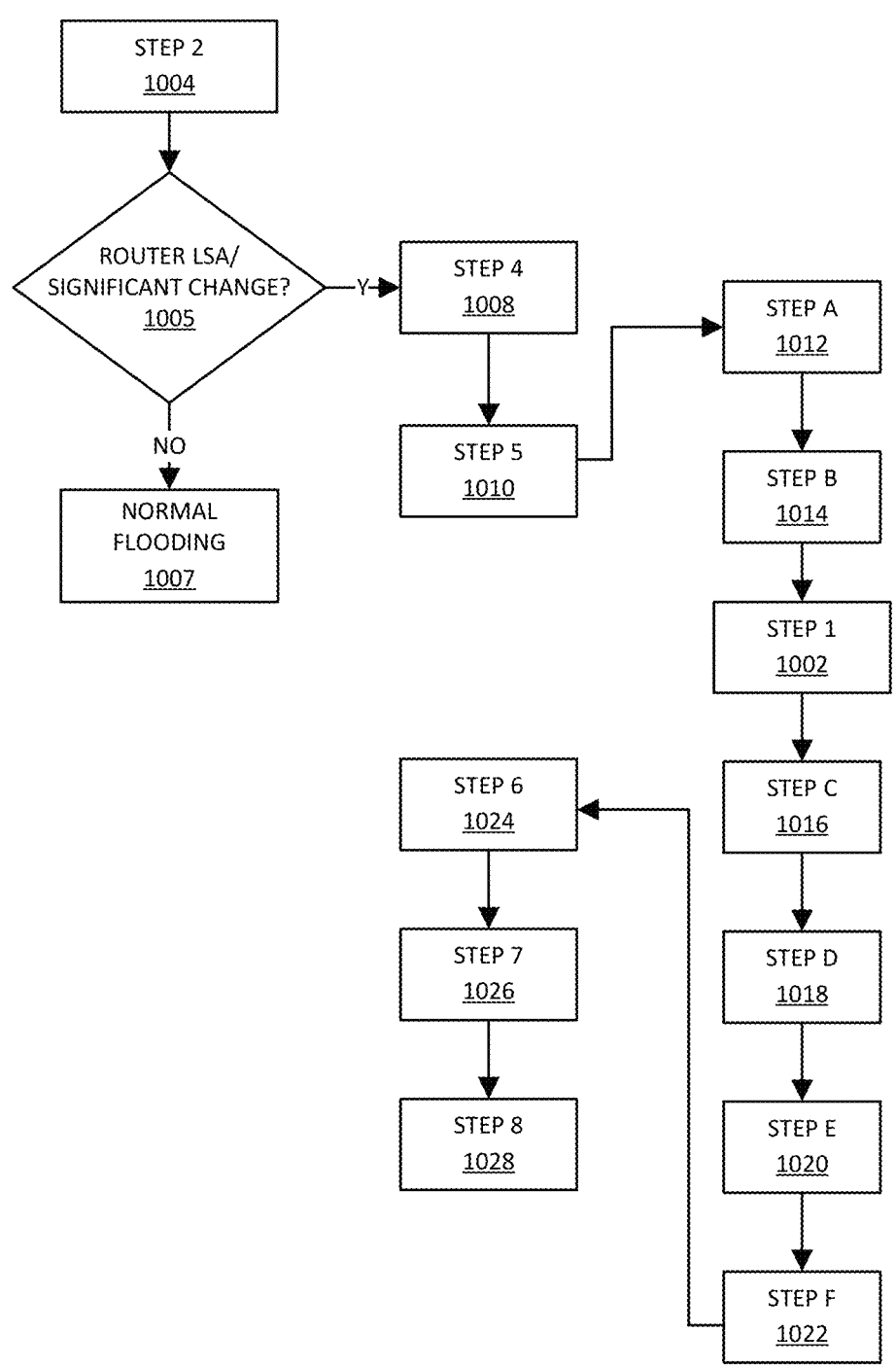
FIG. 11 is a flowchart illustrating an accelerated flooding procedure according to an embodiment of the present disclosure.

FIG. 11 is a flowchart illustrating an accelerated flooding procedure 1100 in OSPF for a router LSA that includes a significant change according to an embodiment of the present disclosure. The accelerated flooding procedure 1100 can be performed by any network node such as, but not limited to, the IS 102 in FIG. 1B. The accelerated flooding procedure 1100 modifies the normal flooding procedure 1000 of FIG. 10 by delaying step 1 (1002), and starting immediately at step 2 (1004) and examining the LSA's LS type. The accelerated flooding procedure 1100 then determines at new step 1005 whether the LSA is a router LSA (i.e., type 1) and if so, whether the router LSA includes a significant change. A significant change can be either a link down, a link up, and/or a link metric change. The significant change can be determined by checking a flag setting (e.g., D flag, U flag, C flag, or S flag as described in FIGS. 2A-2B, FIGS. 3A-3b, and FIGS. 4A-4C) or by performing a comparison with a stored LSA as described in FIG. 8. If the received LSA is not a router LSA that includes a significant change, the accelerated flooding procedure 1100 performs a normal flooding procedure at step 1007, such as the normal flooding procedure 1000 of FIG. 10. In an embodiment, the normal flooding procedure 1000 would skip step 2 (1004) because it has already been performed.

If, at step 1005, the received LSA is a router LSA that includes a significant change, the accelerated flooding procedure 1100, performs step 4 (1008) through step 8 (1028) as described in FIG. 10, except that the accelerated flooding procedure 1100 performs step 1 (1002) (i.e., validate the LSA's LS checksum) immediately after the new LSA is flooded at step B (1014) as part of step 5 (1010). If the checksum is valid, then the steps below such as step C and D are executed; otherwise, discard the LSA, get the next one (LSA) from the Link State Update packet, and process it using the procedure 1100 starting from the beginning (i.e., step 2) if there is one. By delaying the LSA's LS checksum validation step 1 (1002), which is time consuming, until after the new LSA is flooded, the accelerated flooding procedure 1100 is able to accelerate the flooding of the new LSA, which results in faster IGP convergence. In turn, less traffic will be lost when there is a change in the network.

Figure 12:
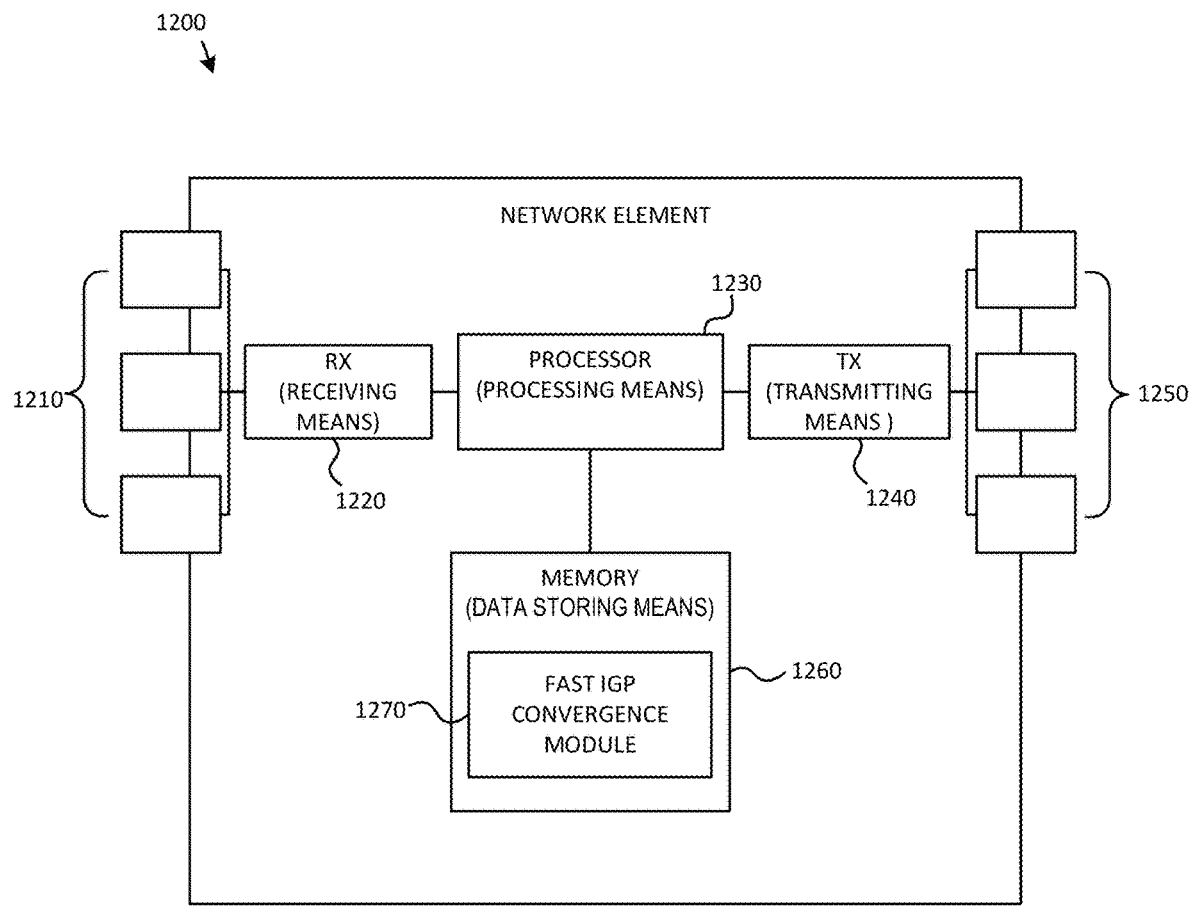
FIG. 12 is a schematic diagram illustrating a network element according to an embodiment of the present disclosure.

FIG. 12 is a schematic diagram illustrating a network element 1200 according to an embodiment of the present disclosure. The network element 1200 can be any network node such as, but not limited to, R1 in FIG. 1A or IS 102 in FIG. 1B. The network element 1200 includes receiver units (RX) 1220 or receiving means for receiving data via ingress ports 1210. The network element 1200 also includes transmitter units (TX) 1240 or transmitting means for transmitting via data egress ports 1250.

The network element 1200 includes a memory 1260 or data storing means for storing the instructions and various data. The memory 1260 can be any type of or combination of memory components capable of storing data and/or instructions. For example, the memory 1260 can include volatile and/or non-volatile memory such as read-only memory (ROM), random access memory (RAM), ternary content-addressable memory (TCAM), and/or static random-access memory (SRAM). The memory 1260 can also include one or more disks, tape drives, and solid-state drives. In some embodiments, the memory 1260 can be used as an over-flow data storage device to store programs when such programs are selected for execution, and to store instructions and data that are read during program execution.

The network element 1200 has one or more processor(s) 1230 or other processing means (e.g., central processing unit (CPU)) to process instructions. The processor 1230 may be implemented as one or more CPU chips, cores (e.g., as a multi-core processor), field-programmable gate arrays (FPGAs), application specific integrated circuits (ASICs), and digital signal processors (DSPs). The processor 1230 is communicatively coupled via a system bus with the ingress ports 1210, RX 1220, TX 1240, egress ports 1250, and memory 1260. The processor 1230 can be configured to execute instructions stored in the memory 1260. Thus, the processor 1230 provides a means for performing any computational, comparison, determination, initiation, configuration, or any other action corresponding to the claims when the appropriate instruction is executed by the processor. In some embodiments, the memory 1260 can be memory that is integrated with the processor 1230.

In one embodiment, the memory 1260 stores a fast IGP convergence module 1270. The fast IGP convergence module 1270 includes data and executable instructions for implementing the disclosed embodiments. For instance, the fast IGP convergence module 1270 can include instructions for implementing the methods described in FIGS. 5-11. The inclusion of the fast IGP convergence module 1270 substantially improves the functionality of the network element 1200 by enabling faster IGP convergence, which, among other things, reduces traffic loss when there is a change in the network.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the disclosure is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

The invention claimed is:

1. A method, performed by a network node, for enabling Interior Gateway Protocol (IGP) fast convergence, the method comprising:
    determining that there is a significant change in link state information, the significant change is at least one of a link down indication, a link up indication, and a link metric change;
    generating a link state packet comprising the link state information for a plurality links, the link state packet comprising a significant change field located between a link state packet header and a plurality of fields describing the plurality of links;
    setting a flag in the significant change field indicating the significant change in the link state information; and
    distributing the link state packet comprising the link state information and the flag indicating the significant change in the link state information.

2. The method of claim 1, wherein the link state packet is one of an Open Shortest Path First version 2 (OSPFv2) router Link State Advertisement (LSA), an OSPFv3 router LSA, and an Intermediate System to Intermediate System (IS-IS) Link State Protocol Data Unit (LSP).

3. The method of claim 1, wherein the flag is at least one of a "S" flag that is set to indicate the significant change, a "D" flag that is set to indicate that there is a link down, a "U" flag that is set to indicate that there is a link up, and a "C" flag that is set to indicate that there is a link metric change.

4. A method, performed by a network node, for enabling Interior Gateway Protocol (IGP) fast convergence, the method comprising:
    receiving a link state packet comprising link state information;
    determining that there is a significant change in the link state information based on a flag setting in the link state packet, the significant change is at least one of a link down indication, a link up indication, and a link metric change;
    performing accelerated flooding of the link state packet by delaying a checksum validation of the link state packet until after the link state packet is flooded to neighboring nodes in response to the significant change; and
    performing the checksum validation of the link state packet after the link state packet is flooded to neighboring nodes and before the link state information is installed in a link state database of the network node.

5. The method of claim 4, wherein the link state packet is one of an Open Shortest Path First version 2 (OSPFv2) router Link State Advertisement (LSA), an OSPFv3 router LSA, and an Intermediate System to Intermediate System (IS-IS) Link State Protocol Data Unit (LSP).

6. The method of claim 4, wherein the flag is at least one of a "S" flag that is set to indicate the significant change, a "D" flag that is set to indicate that there is a link down, a "U" flag that is set to indicate that there is a link up, and a "C" flag that is set to indicate that there is a link metric change.

7. The method of claim 4, wherein the accelerated flooding of the link state packet comprises sending the link state packet from a data plane to a control plane of the network node.

8. The method of claim 4, wherein the accelerated flooding of the link state packet comprises sending an Internet Protocol (IP) link state packet from an IP layer to an Open Shortest Path First (OSPF) of the network node.

9. The method of claim 4, wherein the accelerated flooding of the link state packet comprises sending a link layer link state packet from a link layer to an Intermediate System to Intermediate System (IS-IS) of the network node.

10. A network node configured to perform Interior Gateway Protocol (IGP) fast convergence, the network node comprising:
 a memory storing instructions; and
 a processor coupled to the memory, wherein the processor executes the instructions to cause the network node to:
  determine that there is a significant change in link state information, the significant change is at least one of a link down indication, a link up indication, and a link metric change;
  generate a link state packet comprising the link state information for a plurality links, the link state packet comprising a significant change field located between a link state packet header and a plurality of fields describing the plurality of links;
  set a flag in the significant change field indicating the significant change in the link state information; and
  distribute the link state packet comprising the link state information and the flag indicating the significant change in the link state information.

11. The network node of claim 10, wherein the link state packet is one of an Open Shortest Path First version 2 (OSPFv2) router Link State Advertisement (LSA), an OSPFv3 router LSA, and an Intermediate System to Intermediate System (IS-IS) Link State Protocol Data Unit (LSP).

12. The network node of claim 10, wherein the flag is at least one of a "S" flag that is set to indicate the significant change, a "D" flag that is set to indicate that there is a link down, a "U" flag that is set to indicate that there is a link up, and a "C" flag that is set to indicate that there is a link metric change.

13. A network node configured to perform Interior Gateway Protocol (IGP) fast convergence, the network node comprising:
 a memory storing instructions; and
 a processor coupled to the memory, wherein the processor executes the instructions to cause the network node to:
  receive a link state packet comprising link state information;
  determine that there is a significant change in the link state information based on a flag setting in the link state packet, the significant change is at least one of a link down indication, a link up indication, and a link metric change;
  perform accelerated flooding of the link state packet by delaying a checksum validation of the link state packet until after the link state packet is flooded to neighboring nodes in response to the significant change; and
  perform the checksum validation of the link state packet after the link state packet is flooded to neighboring nodes and before the link state information is installed in a link state database of the network node.

14. The network node of claim 13, wherein the link state packet is one of an Open Shortest Path First version 2 (OSPFv2) router Link State Advertisement (LSA), an OSPFv3 router LSA, and an Intermediate System to Intermediate System (IS-IS) Link State Protocol Data Unit (LSP).

15. The network node of claim 13, wherein the flag is at least one of a "S" flag that is set to indicate the significant change, a "D" flag that is set to indicate that there is a link down, a "U" flag that is set to indicate that there is a link up, and a "C" flag that is set to indicate that there is a link metric change.

16. The network node of claim 13, wherein the processor further executes the instructions to cause the network node to send the link state packet from a data plane to a control plane of the network node.

17. The network node of claim 13, wherein the processor further executes the instructions to cause the network node to send an Internet Protocol (IP) link state packet from an IP layer to an Open Shortest Path (OSPF) of the network node.

18. The network node of claim 13, wherein the processor further executes the instructions to cause the network node to send a link layer link state packet from a link layer to an Intermediate System to Intermediate System (IS-IS) of the network node.

19. The method of claim 1, wherein the significant change field comprises:
 a one-bit significant change field; or
 a one-bit down-link field, a one-bit up-link field, and a one-bit link metric change field.

20. The network node of claim 10, wherein the significant change field comprises:
 a one-bit significant change field; or
 a one-bit down-link field, a one-bit up-link field, and a one-bit link metric change field.

* * * * *

UNITED STATES PATENT AND TRADEMARK OFFICE
CERTIFICATE OF CORRECTION

PATENT NO. : 11,558,282 B2
APPLICATION NO. : 17/068457
DATED : January 17, 2023
INVENTOR(S) : Huaimo Chen et al.

It is certified that error appears in the above-identified patent and that said Letters Patent is hereby corrected as shown below:

In the Claims

Column 19, Lines 19-38, Claim 10, should read:
10. A network node configured to perform Interior Gateway Protocol (IGP) fast convergence, the network node comprising:
    a memory storing instructions; and
    a processor coupled to the memory, wherein the processor executes the instructions to cause the network node to:
    determine that there is a significant change in link state information, the significant change is at least one of a link down indication, a link up indication, and a link metric change;
    generate a link state packet comprising the link state information for a plurality of links, the link state packet comprising a significant change field located between a link state packet header and a plurality of fields describing the plurality of links;
    set a flag in the significant change field indicating the significant change in the link state information; and
    distribute the link state packet comprising the link state information and the flag indicating the significant change in the link state information.

Signed and Sealed this
Twenty-first Day of February, 2023

*Katherine Kelly Vidal*
*Director of the United States Patent and Trademark Office*